US008668225B2

(12) United States Patent
Yamaki et al.

(10) Patent No.: US 8,668,225 B2
(45) Date of Patent: Mar. 11, 2014

(54) VEHICLE SEAT

(75) Inventors: Jogen Yamaki, Utsunomiya (JP); Hisato Oku, Utsunomiya (JP); Takashi Inoue, Tokyo (JP); Takuya Hori, Tokyo (JP); Masato Miyaguchi, Tokyo (JP); Kazuyoshi Arata, Tokyo (JP)

(73) Assignees: Honda Motor Co., Ltd., Tokyo (JP); Tachi-S Co., Ltd., Akishima-Shi, Tokyo (JP)

( * ) Notice: Subject to any disclaimer, the term of this patent is extended or adjusted under 35 U.S.C. 154(b) by 0 days.

(21) Appl. No.: 13/701,136

(22) PCT Filed: Jun. 3, 2011

(86) PCT No.: PCT/JP2011/062825
§ 371 (c)(1),
(2), (4) Date: Jan. 31, 2013

(87) PCT Pub. No.: WO2011/152530
PCT Pub. Date: Dec. 8, 2011

(65) Prior Publication Data
US 2013/0140859 A1 Jun. 6, 2013

(30) Foreign Application Priority Data

Jun. 4, 2010 (JP) ................................. 2010-129222
Jun. 4, 2010 (JP) ................................. 2010-129223

(51) Int. Cl.
*B60R 21/207* (2006.01)
(52) U.S. Cl.
USPC .................................. 280/730.2; 297/216.13
(58) Field of Classification Search
USPC .......... 280/730.2; 297/216.1, 216.12, 216.13, 297/452.18
See application file for complete search history.

(56) References Cited

U.S. PATENT DOCUMENTS 4,512,604 A * 4/1985 Maeda et al. ................. 296/68.1
6,299,238 B1 * 10/2001 Takagi et al. ............. 296/187.12
6,299,239 B1 * 10/2001 Sagawa et al. ........... 296/187.12
(Continued)

FOREIGN PATENT DOCUMENTS

JP 07-267038 10/1995
JP 8-156668 6/1996
(Continued)

OTHER PUBLICATIONS

International Search Report, Dated Jul. 12, 2011.
(Continued)

*Primary Examiner* — Paul N Dickson
*Assistant Examiner* — Robert A Coker
(74) *Attorney, Agent, or Firm* — Rankin, Hill & Clark LLP

(57) ABSTRACT

A vehicle seat includes: a seat back frame that is provided with a pair of side frame portions that are located on both left and right sides in the seat transverse direction; an outer-side load transmitting block that is located further to an outer side in the transverse direction of the seat back frame than the side frame portion of the seat back frame, and that transmits an impact load that is input from a side of the vehicle body to the seat back frame; a protruding portion that protrudes from a side surface of the side frame portion on the outer side in the transverse direction of the seat back frame towards the outer side in the transverse direction of the seat back frame; a side airbag apparatus that is located on a front surface of the protruding portion; and an engaging portion that is formed in the outer-side load transmitting block, and that receives the protruding portion. The protruding portion is formed in a box shape that has a supporting surface on a surface thereof that faces the side airbag apparatus.

8 Claims, 18 Drawing Sheets

(56) References Cited

U.S. PATENT DOCUMENTS

| | | | | |
|---|---|---|---|---|
| 8,033,602 | B2 * | 10/2011 | Yamaki et al. | 297/216.13 |
| 2005/0264053 | A1 * | 12/2005 | Saberan et al. | 297/216.13 |
| 2009/0021061 | A1 * | 1/2009 | Yamaki et al. | 297/216.13 |
| 2010/0270834 | A1 * | 10/2010 | Niitsuma | 297/216.12 |

FOREIGN PATENT DOCUMENTS

| | | |
|---|---|---|
| JP | 9-188215 | 7/1997 |
| JP | 2001-219772 | 8/2001 |
| JP | 2005-067427 | 3/2005 |
| JP | 2009-006895 | 1/2009 |
| JP | 2009-046112 | 3/2009 |

OTHER PUBLICATIONS

Japanese Office Action, Application No. 2010-129223, dated Jan. 15, 2013, 5 pages.

* cited by examiner

VEHICLE SEAT

TECHNICAL FIELD

The present invention relates to a vehicle seat and a seat back frame structure that are provided with structural elements that transmit an impact load that is input from the side of the vehicle towards an area on the inner side in the vehicle transverse direction.

Priority is claimed on Japanese Patent Application Nos. 2010-129222, filed Jun. 4, 2010 and 2010-129223, filed Jun. 4, 2010, the contents of which are incorporated herein by reference.

BACKGROUND ART

A structure is known that transmits an impact load that is input from a side of a vehicle during a collision or the like towards the vehicle floor via the seats (see, for example, Patent document 1). Specifically, in the vehicle seat described in Patent document 1, framework portions of the seat (i.e., the plate components and the top cross member) extend towards an outer side in the vehicle transverse direction beyond the seat back frame, and a load transmitting block is mounted such that it covers this extended portion.

In this seat back frame, when an impact load is input from the vehicle side portion, this load is transmitted to a side frame portion on an outer side in the vehicle transverse direction via the load transmitting components. Furthermore, the load is also transmitted from this side frame portion to a side frame portion on an inner side in the vehicle transverse direction via the plate components on the rear side and via the top cross member.

In addition to this, a structure is also known that transmits an impact load that is input from a side of the vehicle during a collision or the like towards the vehicle floor via the seats (see, for example, Patent document 3).

Specifically, the seat back frame described in Patent document 3 is provided with a pair of side frame portions that are placed on both sides in the vehicle transverse direction, a load transmitting piece that protrudes from a side frame portion on the outer side in the vehicle transverse direction towards the outer side in the vehicle transverse direction, and a load transmitting component that extends from substantially the same height as the load transmitting pieces on the side frame portion on the outer side in the vehicle transverse direction at an inclined attitude towards a bottom portion of a side frame portion on the inner side in the vehicle transverse direction. Moreover, a reclining shaft that is placed so as to bridge the gap between the side frame portions, and so as to support the side frame portions such that they are able to pivot is provided at a bottom end portion of the side frame portions.

According to this structure, while an impact load that is input into a bottom portion of a vehicle side wall is transmitted from the side frame portion on the outer side in the vehicle transverse direction to the side frame portion on the inner side in the vehicle transverse direction via the reclining shaft, in contrast, an impact load that is input into a top portion of a vehicle side wall is transmitted from the load transmitting piece to the side frame portion on the inner side in the vehicle transverse direction via the load transmitting component.

PRIOR ART DOCUMENTS

Patent Documents

[Patent document 1] Japanese Unexamined Patent Application, First Publication No. 2009-46112
[Patent document 2] Japanese Unexamined Patent Application, First Publication No. H7-267038
[Patent document 3] Japanese Unexamined Patent Application, First Publication No. 2009-6895

DISCLOSURE OF INVENTION

Problems to be Solved by the Invention

A structure for a vehicle seat is also known that is provided with a side air bag apparatus that causes a bag body to unfold between a vehicle occupant who is sitting in a seat and a vehicle side wall when an impact is input (see, for example, Patent document 2). In this side air bag apparatus, an inflator that senses an impact and generates gas, and a folded bag that unfolds after receiving gas pressure from the inflator are assembled into a module, and this module is mounted on a side frame portion of a seat back frame.

In addition, in recent years structures have been examined in which, in vehicle seats in which a load transmitting block is fitted in the side frame portion of a seat back frame, a side air bag apparatus is installed in combination with the load transmitting block in the side frame portion.

Here, when a side air bag apparatus is being installed in the structure of the above-described Patent document 1, the positioning of the load transmitting block that receives the vehicle body side portion that moves towards the inner side of the vehicle compartment in a vehicle side-surface collision, and of the side air bag apparatus that unfolds between the vehicle occupant and the vehicle body side portion that moves towards the inner side of the vehicle compartment is crucial.

Therefore, it is an object of the present invention to provide a vehicle seat that makes it possible to improve the efficiency of the load transmission from the side of a vehicle body towards a seat back frame, and that also makes it possible to install a load transmitting component and a side air bag apparatus on a side portion of a seat back frame.

Moreover, in the structure of the above-described Patent document 3, because the load transmitting component is provided so as to bridge the gap between side frame portions while remaining independent of the seat back frame, the structure has low bending rigidity and the efficiency of the load transmission to the seat back frame has not been sufficiently high.

In response to this, improvements such as making the plate thickness of the seat reinforcing components thicker in order to ensure bending rigidity in the seat reinforcing components might be considered, however, the problem arises that this leads both to an increase in the vehicle weight and to a greater complexity of the structure.

Therefore, it is an object of the present invention to provide a seat back frame structure that makes it possible to improve the efficiency of a load transmission from a side of a vehicle body towards the seat back frame by means of a simple structure that is light in weight.

Means for Solving the Problems (1) A vehicle seat according to an aspect of the present invention includes: a seat back frame that is provided with a pair of side frame portions that are located on both left and right sides in the seat transverse direction; an outer-side load transmitting block that is located further to an outer side in the transverse direction of the seat back frame than the side frame portion of the seat back frame, and that transmits an impact load that is input from a side of the vehicle body to the seat back frame; a protruding portion that protrudes from a side surface of the side frame portion on the outer side in the transverse direction of the seat back frame towards the outer side in the transverse direction of the seat back frame; a side airbag apparatus that is located on a front surface of the protruding portion; and an engaging portion that is formed in the outer-side load transmitting block, and that receives the protruding portion, wherein the protruding portion is formed in a box shape that has a supporting surface on a surface thereof that faces the side airbag apparatus.

(2) The above-described vehicle seat may also be structured in the following manner: namely, there may also be further provided a bottom reinforcing plate that connects together bottom portions of the pair of side frame portions.

(3) The above-described vehicle seat may also be structured in the following manner: namely, there may be further provided a supporting plate that is located above the bottom reinforcing plate, and that has an inclined reinforcing portion that is diagonally inclined from the side frame portion that is located on the outer side from among the pair of side frame portions downwards and also inwards in the seat transverse direction.

(4) The above-described vehicle seat may also be structured in the following manner: namely, an end portion on the outer side in the transverse direction of the inclined reinforcing portion of the supporting plate may be connected to the side frame portion on the outer side, and a bottom edge of the supporting plate may be connected to the bottom reinforcing plate over substantially the entire length thereof in the seat transverse direction.

(5) The inclined reinforcing portion of the supporting plate may be provided with a reinforcing plate.

(6) The inclined reinforcing portion and the reinforcing plate may form a closed cross-sectional shape.

(7) There may be further provided a bottom reinforcing portion that extends in the seat transverse direction, and the supporting plate and the bottom reinforcing plate may form a closed cross-sectional shape.

(8) The inclined reinforcing portion of the supporting plate may be provided with a reinforcing plate, and the supporting plate may be provided with: the inclined reinforcing portion, which is formed by the supporting plate and the reinforcing plate in a closed cross-sectional shape; and with the bottom reinforcing portion, which is formed by the supporting plate and the bottom reinforcing plate in a closed cross-sectional shape, and which extends in the seat transverse direction.

Effects of the Invention

According to the invention described above in (1), it is possible to fix an outer-side load transmitting block in a state in which a box-shaped protruding portion is housed in an engaging portion of the outer-side load transmitting block. By doing this, even if an impact load is input into the outer-side load transmitting block, for example, from a direction diagonally forward of or a direction diagonally rearward of the vehicle body (i.e., from a direction that intersects the transverse direction), any shifting of the outer-side load transmitting block or any deformation or the like of the protruding portion can be suppressed. Accordingly, not only collision loads from directly side-on to the vehicle, but collision loads from diagonal directions and the like as well can be rapidly transmitted towards the inner side in the vehicle transverse direction irrespective of the input direction of the collision load.

Moreover, by placing the side airbag apparatus on the front surface of the protruding portion, because the reaction force when the bag body of the side airbag apparatus is unfolded can be reliably received by the protruding portion, an even faster unfolding of the bag body can be achieved. As a result, an even faster unfolding of the bag body can be achieved.

According to the invention described above in (2), (3), and (4), by connecting the supporting plate to the bottom reinforcing plate over substantially the entire length thereof in the seat transverse direction, the impact load that is transmitted via the side frame portion on the outer side to the inclined reinforcing portion is transmitted via the bottom reinforcing plate to the side frame portion on the inner side while also being transmitted to substantially the entire length of the load pass structure including to the supporting plate and the bottom reinforcing plate. Namely, once an impact load that is input into the inclined reinforcing portion has been received over substantially the entire length of the load pass structure and has been dispersed over the entire length of the load pass structure, it is transmitted via the bottom reinforcing plate to the side frame portion on the inner side.

As a result of this, a collision load can be rapidly transmitted towards the inner side in the vehicle transverse direction, and the efficiency of the load transmission to the seat back frame structure can be improved. In this case, because the load transmission efficiency can be improved, it is not necessary to make the plate thickness and the like of the load pass structure thicker in order to ensure bending rigidity. Because of this, it is possible to provide a load pass structure having a simple structure in which the plate thickness is comparatively thin and in which a reduction in weight has been achieved.

According to the invention described above in (5), by providing the reinforcing plate in the inclined reinforcing portion, it is possible to improve the bending rigidity of the inclined reinforcing portion, and to suppress deformation of the seat back frame structure. Because of this, an impact load can be transmitted effectively to the side frame portion on the inner side.

According to the invention described above in (6), by forming the closed cross-sectional structure shape from the inclined reinforcing portion and the reinforcing plate, it is possible to improve the bending rigidity of the load pass structure, and to more reliably suppress deformation of the seat back frame structure.

According to the invention described above in (7), by providing the bottom reinforcing portion that is formed in the closed cross-sectional structure shape from the supporting plate and the bottom reinforcing plate, it is possible to improve the bending rigidity of the load pass structure, and to more reliably suppress deformation of the seat back frame structure.

According to the invention described above in (8), by forming the two closed cross-sectional structures between the side frame portions, it is possible to improve the bending rigidity of the load pass structure, and to more reliably suppress deformation of the seat back frame structure.

EMBODIMENTS FOR CARRYING OUT THE INVENTION

Hereinafter, a vehicle seat according to a first embodiment of the present invention will be described based on the drawings. Note that this first embodiment specifically describes the purpose of the invention in order to facilitate an understanding thereof, and unless otherwise specified, is in no way intended to limit the present invention.

Figure 1:
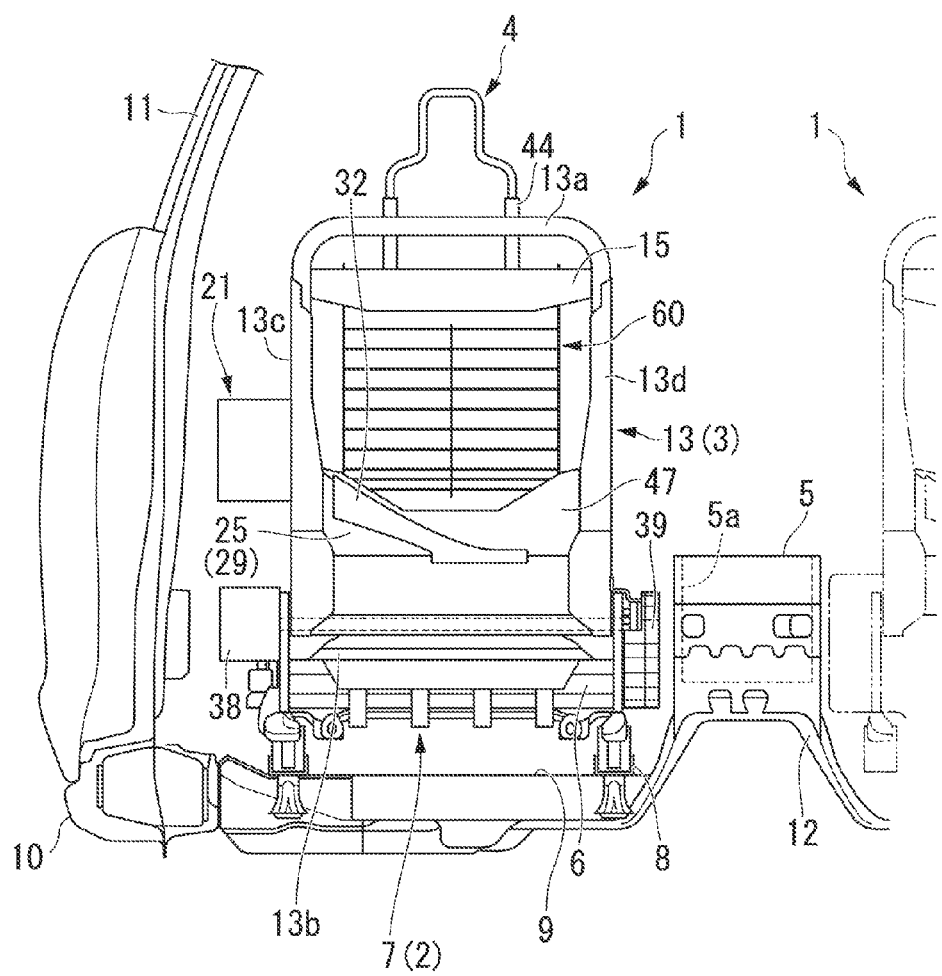
FIG. 1 is a rear view of a front vehicle seat on the left-hand side of a vehicle compartment according to a first embodiment of the present invention.

FIG. 1 is a rear view of a front seat on the left-hand side of a vehicle compartment. Note that in the drawings, the arrow FR indicates the front of the vehicle, while the arrow OUT indicates the outer side in the transverse direction of the vehicle.

As is shown in FIG. 1, a floor tunnel 12 that protrudes upwards is formed extending in the longitudinal direction of the vehicle body in a center portion in the vehicle transverse direction of a vehicle body floor 9. A pair of left and right front seats 1 and 1 are placed individually on both side portions of this floor tunnel 12.

Side sills 10 having a closed cross-sectional structure that are joined to both side edges of the vehicle body floor 9 are provided extending in the vehicle longitudinal direction on the vehicle compartment outer sides of the left and right seats 1 and 1. A bottom portion of a center pillar 11 is connected to each side sill 10. Here, in FIG. 1, in order to simplify the description, only the top framework portion of the seat 1 is shown (this also applies in the following drawings as well).

A console box 5 in whose top surface is provided a recessed storage portion 5a is fixed between the left and right seats 1 and 1 on top of the floor tunnel 12.

Figure 2:
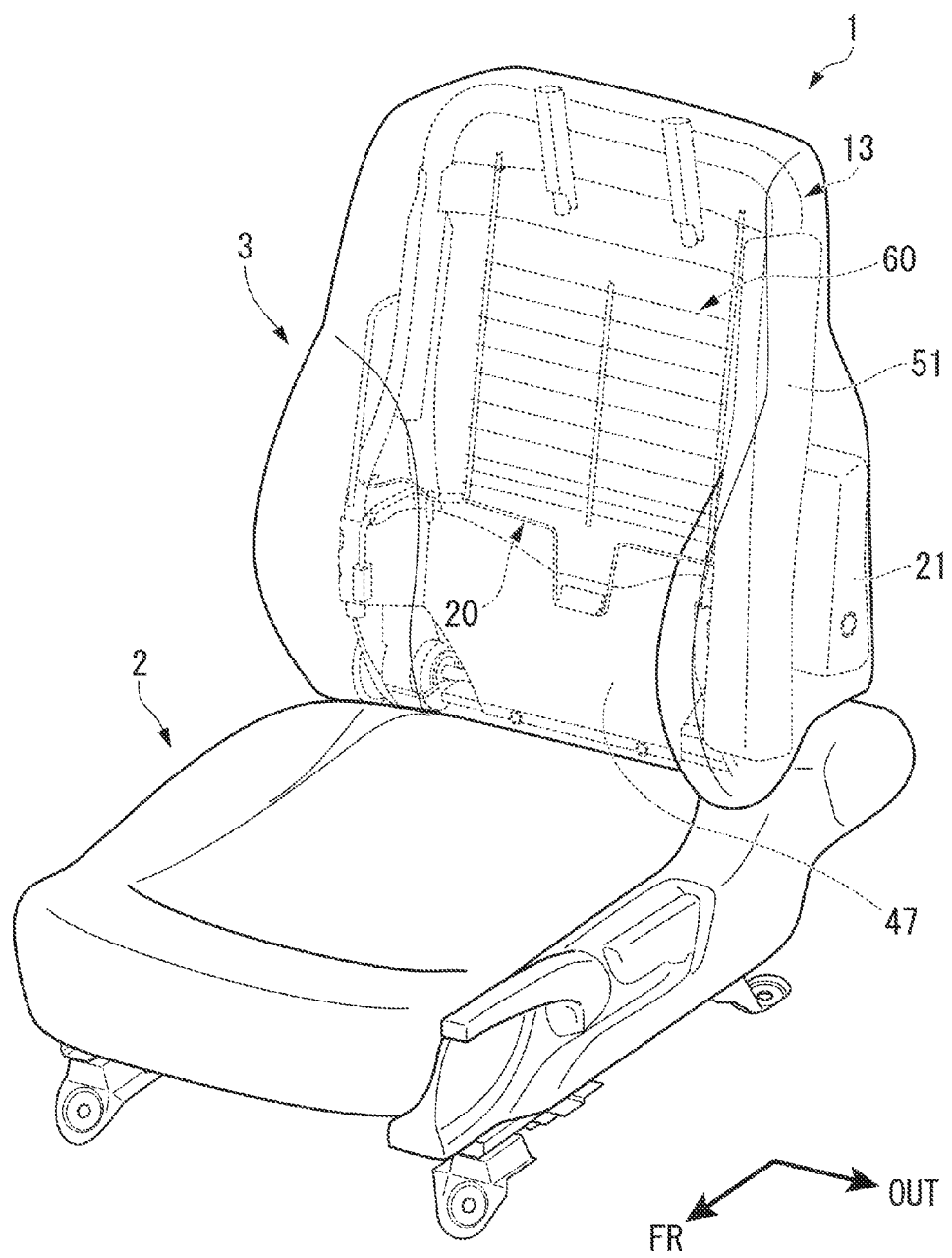
FIG. 2 is a perspective view looking from a direction diagonally in front showing a vehicle seat according to the same embodiment.
Figure 3:
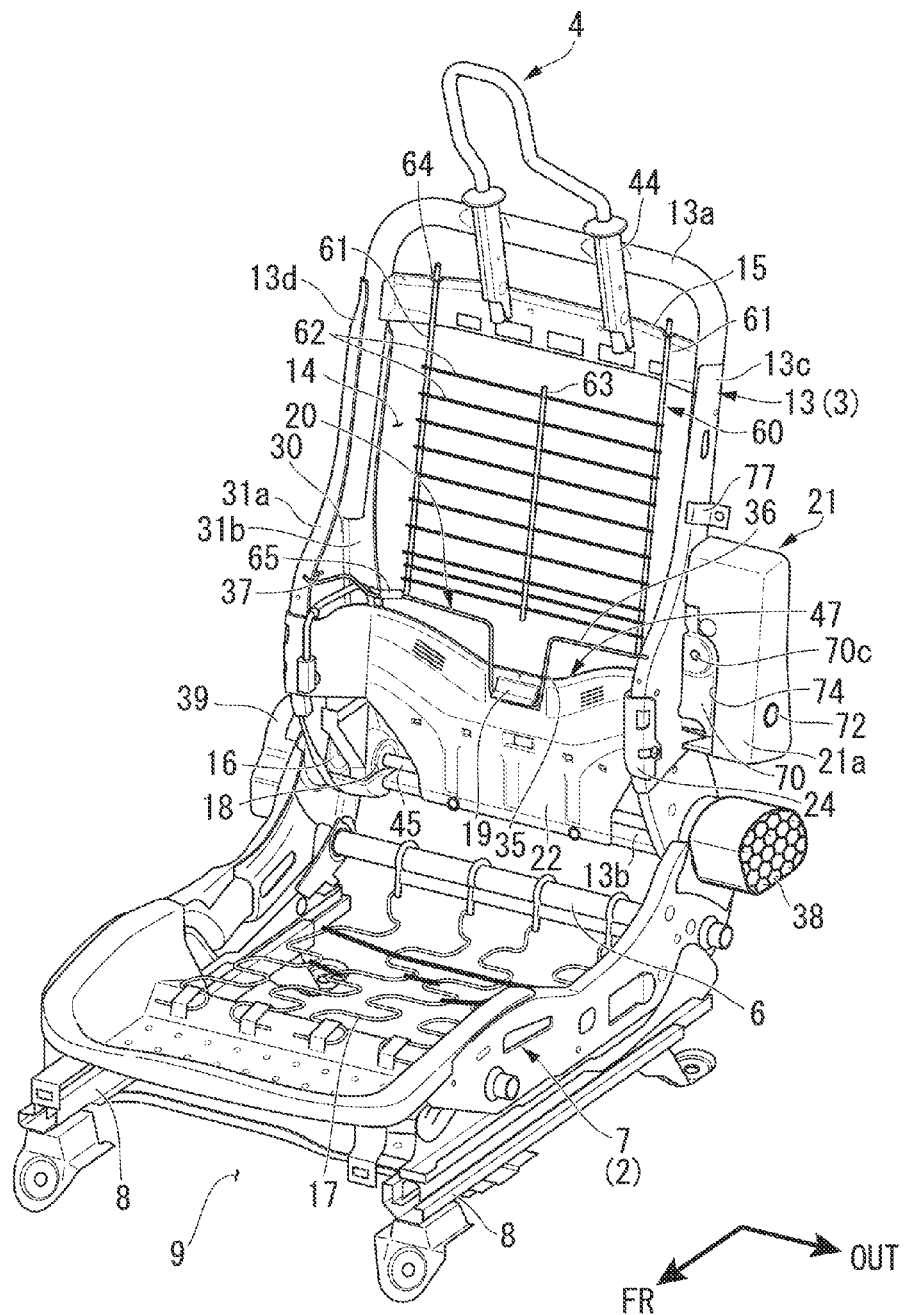
FIG. 3 is a perspective view looking from a direction diagonally in front showing framework portions of a vehicle seat according to the same embodiment.

FIG. 2 is a perspective view looking from a direction diagonally in front showing a vehicle seat 1 that is installed on the front seat side of a vehicle. FIG. 3 is a perspective view also looking, in the same way, from a direction diagonally in front and showing framework portions of this vehicle seat 1. Note that in the following description, unless specifically indicated otherwise, the transverse direction is the same direction as the vehicle transverse direction (i.e., the seat transverse direction).

As is shown in FIG. 2, the vehicle seat 1 is provided with a seat cushion 2 that supports the posterior of a vehicle occupant, a seat back 3 that is continuous with a rear end portion of the seat cushion 2 and that supports the hip and back portions of the vehicle occupant, and a headrest 4 that is supported on a top portion of the seat back 3 and that supports the head and neck portions of the vehicle occupant (only the framework is shown in FIG. 3).

As is shown in FIG. 3, the seat cushion 2 is provided with a seat cushion frame 7 to which is attached a rear cross member 6 that extends in the transverse direction at the rear end portion of the seat cushion frame 7. The seat cushion frame 7 is mounted via seat rails 8 and 8 such that it is able to slide backwards and forwards on the vehicle floor 9.

The seat cushion frame 7 is a component that is formed in a U shape, and left and right rear end portions thereof extend slightly diagonally upwards. Cushion springs 17 are stretched under tension inside the cushion seat frame 7 (see FIG. 3).

(Seat Back Frame Structure)

Figure 4:
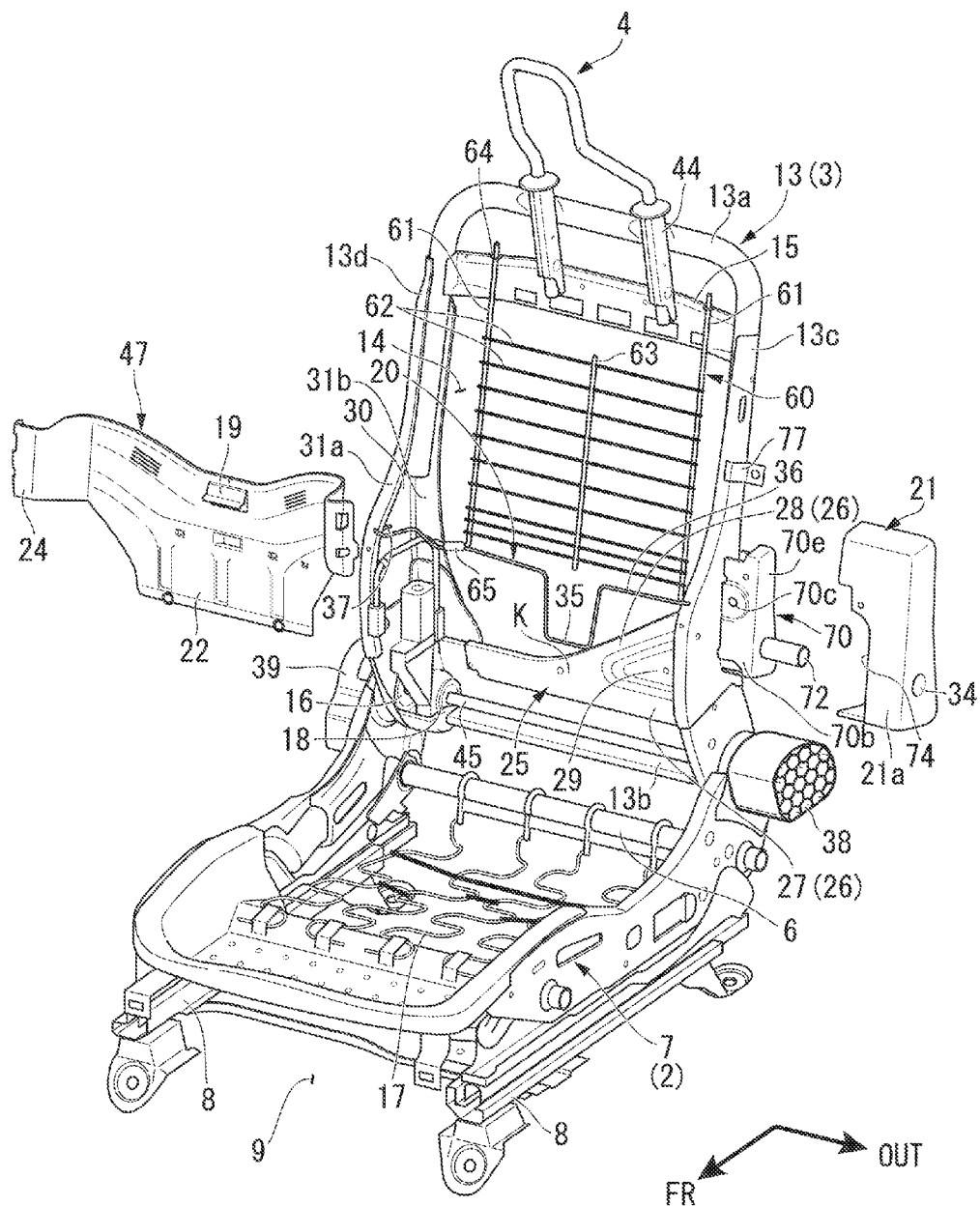
FIG. 4 is an exploded perspective view of framework portions of a seat back according to the same embodiment.

FIG. 4 is an exploded perspective view showing framework portions of the seat back 3.

As is shown in FIG. 3 and FIG. 4, the seat back 3 is provided with a substantially rectangular frame-shaped seat back frame 13 that is formed by a top frame portion 13a, left and right side frame portions 13c and 13d, and a bottom frame portion 13b. A bottom end of this seat back frame 13 is tiltably joined to a rear end portion of the seat cushion frame 7.

The top frame portion 13a is provided with a substantially U-shaped pipe component, and supporting pipes 44 that support the head rest 4 such that the head rest 4 can be raised or lowered are attached to the center of a top piece portion thereof that extends in the transverse direction. In addition, a top cross member 15 is provided on the top frame portion 13a so as to bridge the gap between both end sides in the transverse direction. The top cross member 15 curves from both sides in the transverse direction towards the rear in the center portion thereof, and base end sides of the aforementioned supporting pipes 44 are fixed thereto.

The left and right side frame portions 13c and 13d are provided with panel components whose cross-section in a horizontal direction is substantially U-shaped, and an area on the upper side thereof has a smaller front-rear width than a substantially central portion in the vertical direction thereof, while an area on the lower side thereof has a relatively larger front-rear width than the substantially central portion thereof. The areas on the upper side of the side frame portions 13c and 13d that have a narrower front-rear width are fixed by welding to their corresponding side pieces of the top frame portion 13a such that the U-shaped cross-section portions of the side frame portion 13c and 13d wrap around the side pieces of the top frame portion 13a from the outer side in the transverse direction. In addition, hinge portions 16 that are connected to the rear end portion of the seat cushion frame 7, and reclining mechanisms 18 that are used to adjust the tilt angle of the seat back frame 13 are attached to the bottom end sides of the side frame portions 13c and 13d. Note that the left and right reclining mechanisms 18 are connected by means of an operating rod 45 that extends in the transverse direction such that they are able to move in synchronization with each other.

The bottom frame portion 13b is provided with a panel component whose cross-section in a vertical direction is substantially S-shaped (see FIG. 8), and extends in a transverse direction such that a top half portion thereof surrounds the operating rod 45 from the rear side, while both end portions thereof are joined to bottom ends of the left and right side frame portions 13c and 13d.

In the left and right side frame portions 13c and 13d, a front wall 31a and a rear wall 31b that each bend inwards in the transverse direction are connected to the front and rear respectively of a side wall 30 that is located on the outer side in the transverse direction, and the side wall 30 portions are formed such that, as is described above, the width of the upper side above a substantially central portion becomes narrower, while the width of the lower side below the substantially central portion becomes wider. Specifically, in the side walls 30, the rear end side is formed substantially straight over the entire vertical length thereof, however, the front end side is formed substantially straight from the top portion thereof as far as the central area in a vertical direction, but from the central area downwards it curves so as to gradually protrude towards the front. Accordingly, a curved surface that follows the curved shape of the front-end side of the side wall 30 is provided in the front walls 31a of the side frame portions 13c and 13d.

Figure 5:
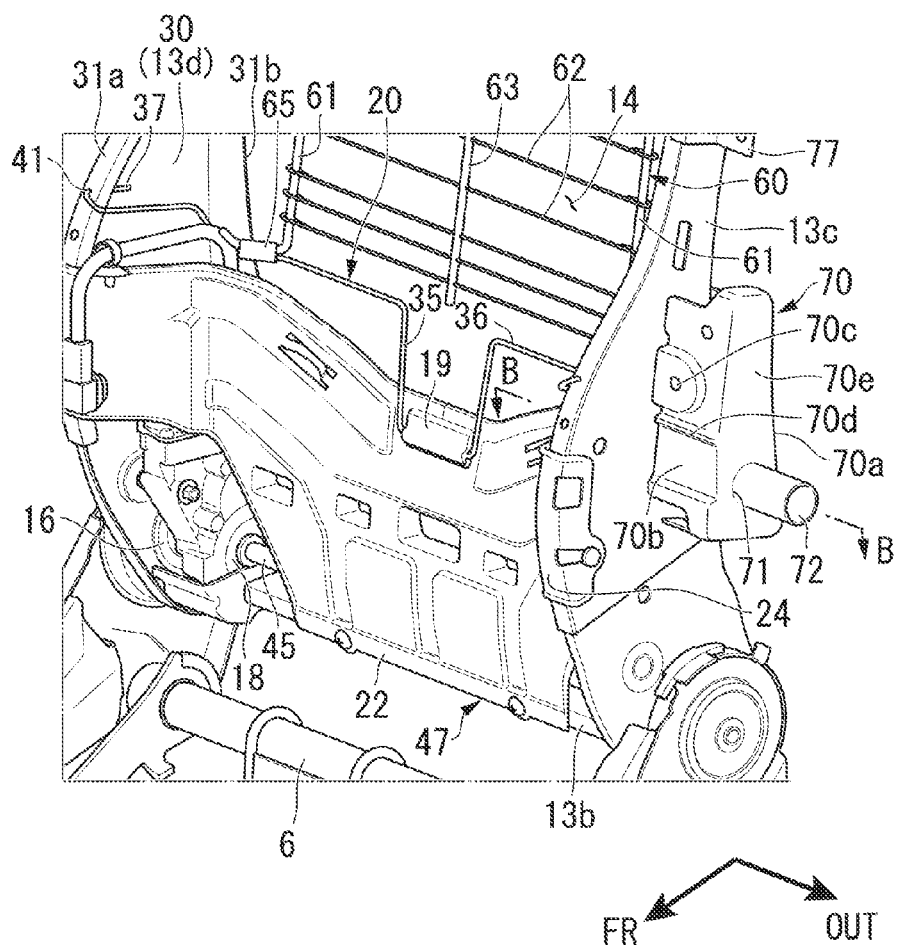
FIG. 5 is an enlarged perspective view of framework portions of a seat back according to the same embodiment.

FIG. 5 is an enlarged perspective view showing framework portions of the seat back 3.

As is shown in FIG. 3 through FIG. 5, a back pan 47 that is formed, for example, from resin as a three-dimensionally curved plate component is placed between the side frame portions 13c and 13d. Specifically, the back pan 47 has a pelvis supporting body 22 whose cross-section in a horizontal direction is formed in a U shape, and distal end portions 24 that extend from both sides of the pelvis supporting body 22 and that are formed so as to bend around from the front wall 31a side of the side frame portions 13c and 13d as far as the outer surface of the side walls 30.

The pelvis supporting body 22 extends across so as to bridge the gap between the side frame portions 13c and 13d at the rear portion side in the front-rear direction of the side frame portions 13c and 13d, and both sides thereof extend towards the front following the inside surfaces of the side walls 30 of the side frame portions 13c and 13d. Namely, the pelvis supporting body 22 supports the vehicle occupant when the vehicle occupant is sitting in the seat 1 by enveloping the vehicle occupant from the rear from the pelvic region down to the vicinity of the lower lumbar region. A bottom edge portion of the central portion in the transverse direction of the pelvis supporting body 22 is fastened by screws or the like to the bottom frame portion 13b.

Moreover, the distal end portions 24 are fastened by screws or the like to the outer surface sides of the side frame portions 13c and 13d.

(Load Pass Structure)

Figure 6:
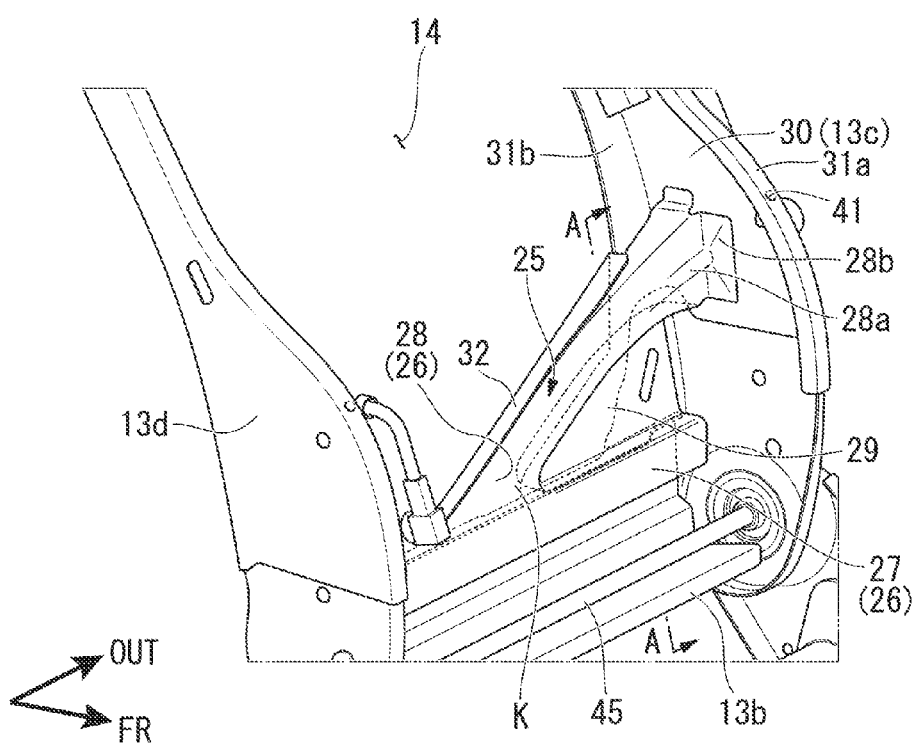
FIG. 6 is an enlarged perspective view of framework portions of a seat back from which a back pan has been removed according to the same embodiment.
Figure 7:
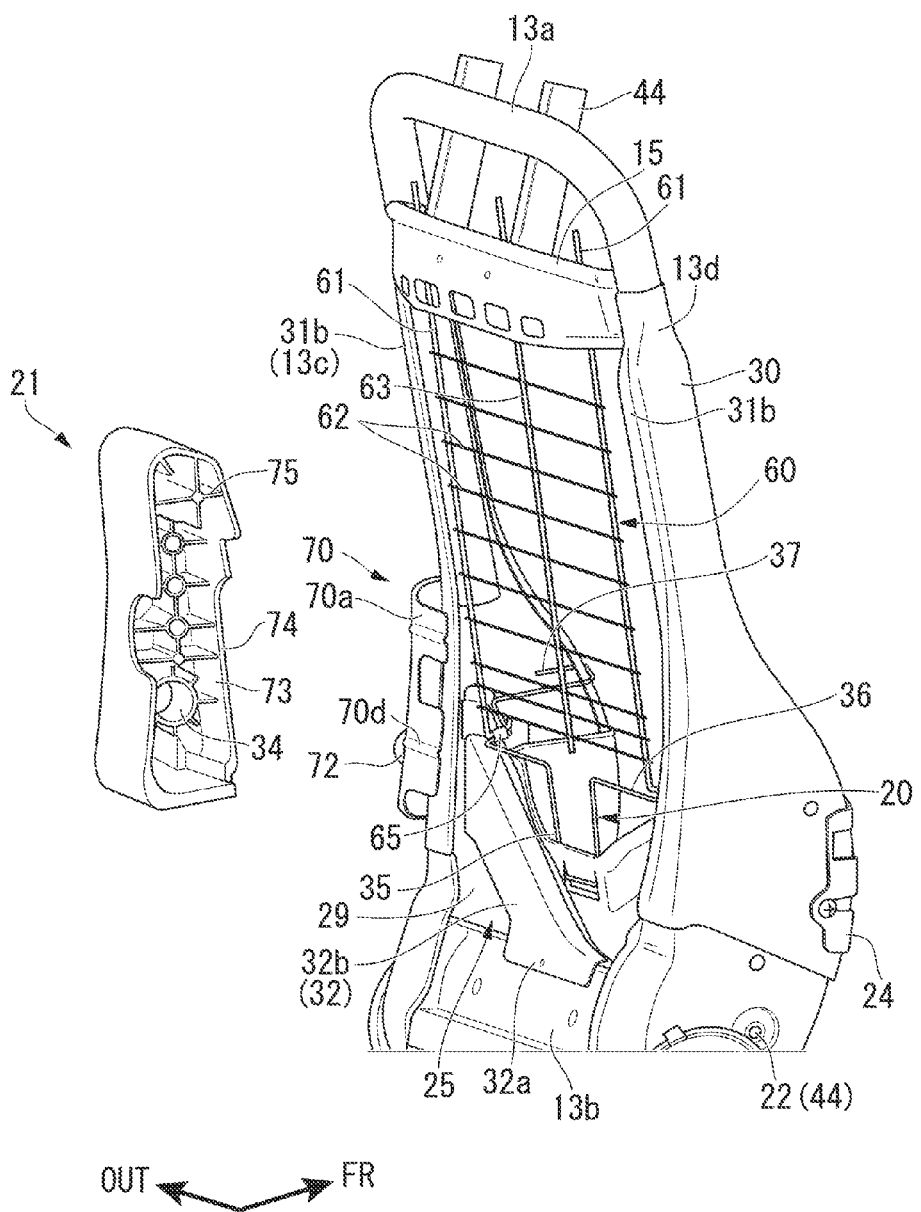
FIG. 7 is a perspective view looking from a rear surface side of framework portions of a seat back according to the same embodiment.
Figure 8:
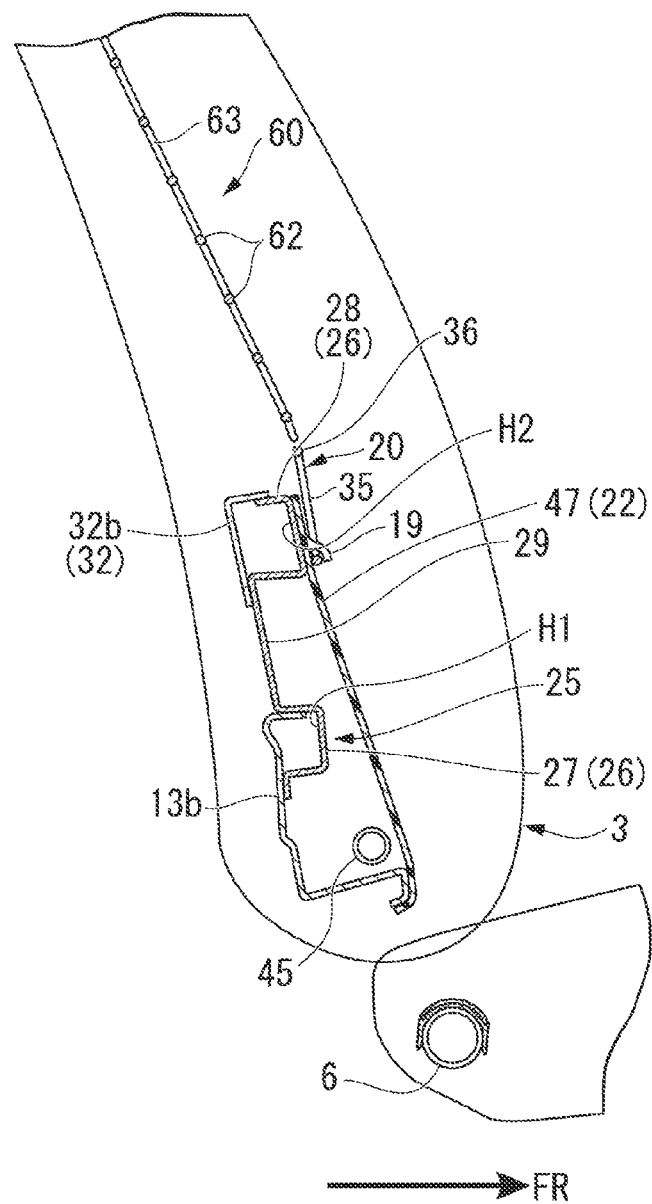
FIG. 8 is a cross-sectional view taken along a line A-A in FIG. 6.

FIG. 6 is an enlarged perspective view showing framework portions of the seat back 3 from which the back pan 47 has been removed. FIG. 7 is a perspective view showing the seatback 3 from the rear surface side thereof. FIG. 8 is a cross-sectional view taken along a line A-A in FIG. 6.

As is shown in FIG. 6 and FIG. 7, a load pass plate 25 is provided between the back pan 47 and the bottom frame portion 13b in the front-rear direction such that it overlaps with the back pan 47 in the front-rear direction. The load pass plate 25 is made, for example, from metal and is formed substantially in a triangular shape when viewed from the front-rear direction. Specifically, the load pass plate 25 is provided with a channel portion 26 whose cross-section in a vertical direction is formed in a U shape, and that extends substantially in a Y shape when viewed from the front-rear direction. The channel portion 26 is provided with a bottom channel 27 whose cross-section is formed in a U shape and that is formed so as to bridge the gap between the side frame portions 13c and 13d, and with an inclined channel 28 whose cross-section is formed in a U shape and that splits off from the bottom channel 27 at a point partway along the lengthwise direction thereof.

As is shown in FIG. 4, FIG. 6, and FIG. 7, the bottom channel 27 is placed such that the aperture portion of the U-shaped cross-section faces towards the rear, and such that it engages with the top half portion of the bottom frame portion 13b, and the entire lengths of the bottom edge portion and top edge portion thereof are fixed by welding to the bottom frame portion 13b. Specifically, the top edge portion of the bottom channel 27 is fixed to the top edge portion of the bottom frame portion 13b, and the bottom edge portion of the bottom channel 27 is fixed to the front surface of the bottom frame portion 13b. As a result, the bottom channel 27 and the bottom frame portion 13b form a closed cross-sectional structure portion H1 that has a rectangular-shaped cross-section and that extends in the transverse direction between the side frame portions 13c and 13d, and that contributes to the load transmission between the side frame portions 13c and 13d.

Moreover, an end portion on the outer side in the transverse direction of the bottom channel 27 is fixed by welding to the inner surface of the side wall 30 of the side frame portion 13c, while an end portion on the inner side in the transverse direction of the bottom channel 27 has a small gap between itself and the inner surface of the side wall 30 of the side frame portion 13d. Specifically, the end portion on the inner side in the transverse direction of the bottom channel 27 extends further to the inner side than the central portion in the transverse direction of the bottom frame portion 13b, and is formed as far as a position where it overlaps with the rear wall 31b of the side frame portion 13d when viewed from the front-rear direction. Namely, the bottom channel 27 and the bottom frame portion 13b are connected together over substantially the entire length in the transverse direction of the bottom frame portion 13b. Because of this, the end portion on the outer side in the transverse direction of the above-described closed cross-sectional structure portion H1 as well also abuts against the inner surface of the side wall 30 of the side frame portion 13c, while the end portion on the inner side in the transverse direction thereof has a slight gap between itself and the inner surface of the side wall 30 of the side frame portion 13d. The bottom channel 27 and the bottom frame portion 13b are connected together over a range that extends from the end portion on the outer side in the transverse direction of the bottom frame portion 13b as far as the inner side beyond the central portion in the transverse direction of the bottom frame portion 13b. The bottom channel 27 and the bottom frame portion 13b overlap in such a manner that the entire length in the transverse direction of the bottom end of the bottom channel 27 overlaps in the front-rear direction with the bottom frame portion 13b.

The inclined channel 28 is formed so as to continue on from the bottom channel 27, and extends diagonally upwards as it moves outwards in the transverse direction from a position K where it branches off from the bottom channel 27. An attachment piece 28b (see FIG. 6) that is bent outwards is formed on an end portion on the outer side in the transverse direction of the inclined channel 28, and this attachment piece 28b is fixed to the inner surface of the side wall 30 of the side frame portion 13c.

In this case, the end surface on the outer side in the transverse direction of the inclined channel 28 is located opposite a load transmitting block 21 (described below) with the side frame portion 13c sandwiched between them. The inclined channel 28 is formed such that the width thereof increases as it moves outwards in the transverse direction, and a bead 28a that bulges outwards is formed in a circumferential surface of the inclined channel 28.

Moreover, a flat plate portion 29 is formed between the bottom channel 27 and the top channel 28 integrally with the respective channels 27 and 28 so as to span across an area enclosed by the top edge portion of the bottom channel 27 and the bottom edge portion of the inclined channel 28. As a result of this, the inclined channel 28 and the bottom frame portion 13b are connected over the entire length in the lengthwise direction of the inclined channel 28 via the bottom channel 27 and the flat plate portion 29.

Moreover, a reinforcing plate 32 is provided on the rear surface side of the load pass plate 25 so as to cover an aperture portion of the inclined channel 28. The reinforcing plate 32 is a plate component whose cross-section in a vertical direction is formed in an L shape, and that is formed such that a top side thereof circles around as far as the top edge portion of the inclined channel 28. Specifically, the reinforcing plate 32 is provided with a base portion 32a (see FIG. 7) whose base end portion is fixed by welding to the rear surface of the bottom frame portion 13b, and with an inclined portion 32b that inclines so as to follow the inclined channel 28 as it moves towards the outer side in the transverse direction from the base portion 32a. The top edge portion of the inclined portion 32b is fixed by welding across the entire length of the top edge portion of the inclined channel 28, and the bottom edge portion thereof is fixed by welding to the rear surface of the flat plate portion 29. As a result of this, the reinforcing plate 32 and the inclined channel 28 form a closed cross-sectional structure portion H2 (see FIG. 8) that has a rectangular cross-section and that extends diagonally upwards as it moves from the branch position K outwards in the transverse direction, and that contributes to the load transmission between the side frame portions 13c and 13d.

Namely, in the present embodiment, between the side frame portions 13c and 13d there are provided the closed cross-sectional structure portion H1, which extends in the transverse direction, and the closed cross-sectional structure portion H2, which branches off from the closed cross-sectional structure portion H1 and which is inclined diagonally upwards as it moves outwards in the transverse direction, and the two closed cross-sectional structure portions H1 and H2 are provided in the vertical direction on the outer side in the transverse direction of the seat 1. Note that a load pass structure is formed by the load pass plate 25, the bottom frame portion 13b and the reinforcing plate 32.

(Planar Elastic Body and Supporting Body Wire)

Here, as is shown in FIG. 3 and FIG. 5, supporting body wires and a planar elastic body 60 are provided in an aperture portion 14 that is open in the front-rear direction between the back pan 47 and the top cross member 15 so as to bridge the gap between the back pan 47 and the top cross member 15.

Firstly, the supporting body wire 20 is a metal wire that has been bent, for example, into a crank shape, and is provided so as to elastically bridge the gap between a hook 19 that is formed in the pelvis supporting body 22 of the back pan 47 and the side frame portions 13c and 13d. Specifically, the supporting body wire 20 is provided with an engaging portion 35 (see FIG. 4) that engages with the hook 19 of the back pan 47, extended portions 36 that extend in the transverse direction from both ends of the engaging portion 35, and folded back portions 37 (see FIG. 5) that are formed at the distal ends of the extended portions 36 and are linked to each of the side frame portions 13c and 13d.

Note that the above-described hook 19 of the back pan 47 is a tongue-shaped component that is formed by cutting open the top portion of the pelvis supporting body 22, and that extends in a downward direction.

The engaging portion 35 is bent substantially in a U shape that is open towards the top, and the bottom side portion thereof is engaged with the hook 19 of the back pan 47, while both ends of this bottom side portion are each bent in an upward direction.

Base end sides of the extended portions 36 extend respectively from the two ends of the engaging portion 35 towards the side frame portions 13c and 13d, and distal end sides thereof are bent towards the front and then extend along the internal surfaces of the side walls 30 of the side frame portions 13c and 13d.

The folded back portions 37 are formed such that the distal end sides of the extended portions 36 are folded back towards the rear, and encircle around the front walls 31a of the side frame portions 13c and 13d and are then inserted into through holes 41 that are formed in the front walls 31a. As a result, the two ends of the supporting body wire 20 are linked to the supporting frame portions 13c and 13d.

The planar elastic body 60 that elastically bridges the gap between the supporting body wire 20 and the top portion cross member 15 is provided in the aperture portion 14 between the supporting body wire 20 and the above-described top portion cross member 15. The planar elastic body 60 is provided with wires that are made of metal or the like and are stretched in a lattice shape between the top portion cross member 15 and the supporting body wire 20. Namely, the planar elastic body 60 is provided with a pair of bolster wires 61 that extend across the gap between the top portion cross member 15 and the supporting body wire 20, a plurality of stringer wires 62 that extend between the bolster wires 61, and a linking wire 63 that joins the respective stringer wires 62 together in a group.

The respective bolster wires 61 extend in parallel with each other in a vertical direction at both sides in the transverse direction of the seat 1. A top end portion of each bolster wire 61 is inserted respectively into one of a pair of attaching pieces 64 that are formed in the top portion cross member 15, and is fixed therein. In contrast, bottom end portions of each bolster wire 61 are bundled by a binding tool 65 together with the respective extended portions 36 of the supporting body wire 20. At this time, the bolster wire 61 and the supporting body wire 20 are bundled inside the binding tool 65 such that they are able to pivot around the respective axes of the wires 20 and 61.

Each stringer wire 62 extends in the transverse direction, and each of the two end portions thereof is wound respectively around one of the bolster wires 61 and is fixed thereto. The respective stringer wires 62 are arranged in parallel with each other in the vertical direction, and the pitch between each stringer wire 62 is set such that this pitch is narrower at the bottom than at the top. Because of this, the rigidity of the planar elastic body 60 is set such that it becomes higher in stages moving from the top towards the bottom.

The linking wire 63 extends in parallel with the bolster wires 61, and it is placed such that it links together central portions of the respective stringer wires 62 in the lengthwise direction thereof.

The wire diameter of the wires 61 through 63 is formed narrower than the wire diameters of the above-described supporting body wire 20. Because of this, the rigidity of the planar elastic body 60 is set lower than that of the supporting body wire 20. Namely, the aperture portion 14 of the seat back frame 13 of the present embodiment is bridged by the supporting body wire 20 and the planar elastic body 60, and the rigidity thereof is set such that it becomes sequentially lower in stages moving from the plate-shaped back pan 47 to the supporting body wire 20, and then to the planar elastic body 60.

(Load Transmitting Component)

Figure 9:
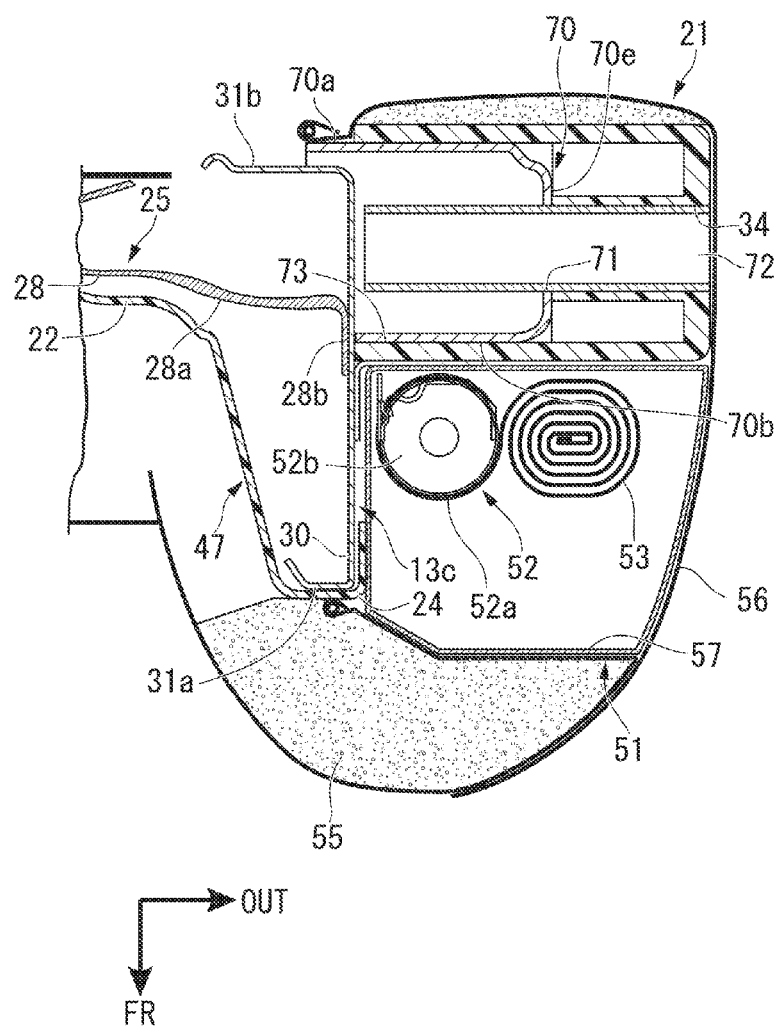
FIG. 9 is a cross-sectional view taken along a line B-B in FIG. 5.

FIG. 9 is a cross-sectional view taken along a line B-B in FIG. 5.

As is shown in FIG. 5, FIG. 7, and FIG. 9, a protruding portion 70 that protrudes towards the outer side in the transverse direction is provided on the side wall 30 on the outer side in the transverse direction of the side frame portion 13c. The protruding portion 70 is formed in a hollow box shape that is open towards the inner side in the transverse direction. A rear surface 70a of this protruding portion 70 is formed longer in the transverse direction than a front surface 70b thereof. Namely, while a distal end portion of the front surface 70b abuts against a central portion in the front-rear direction of the side wall 30 of the side frame portion 13c, the distal end portion of the rear surface 70a continues on to the rear wall 31b side of the side frame portion 13c and is joined to the side frame portion 13c. Moreover, a mounting hole 70c that is used to mount a side airbag apparatus 51 (described below) is formed in the front surface 70b of the protruding portion 70. Note that a bead 70d that extends in the transverse direction is formed on the outer circumferential surface of the protruding portion 70, and is provided in order to limit any buckling of the protruding portion 70.

A through hole 71 is formed in a side surface 70e of the protruding portion 70, and a cylindrical guide pipe 72 is inserted into this through hole 71 and is then welded in place. Namely, the guide pipe 72 extends in the transverse direction. Note that a slight gap is left between the end surface in the axial direction of the guide pipe 72 and the side wall 30 of the side frame portion 13c.

As is shown in FIG. 4, FIG. 7, and FIG. 9, the load transmitting block 21 is fixed in a state of engagement with the guide pipe 72. The load transmitting block 21 is a component that transmits to the side frame portion 13c any impact load that is input into the side wall of the vehicle body during a side collision of the vehicle. The load transmitting block 21 is formed with the cylindrical cross-section thereof divided into honeycomb structures that are arranged in parallel with each other by a plurality of internal ribs 75 that extend in the transverse direction, and the overall shape of the block 21 is a rectangular shape that is elongated in the vertical direction and is formed from resin. Moreover, the load transmitting block 21 is provided with an engaging hole 34 with which the guide pipe 72 that protrudes from the side frame portion 13c is engaged. When the guide pipe 72 has been engaged inside the engagement hole 34, the load transmitting block 21 is fastened to the protruding portion 70 by means of screws or the like.

Furthermore, a housing portion (i.e., an engagement portion) 73 that receives the above-described protruding portion 70 is formed on the inner side of the load transmitting block 21. As a result, the load transmitting block 21 is mounted so as to cover the protruding portion 70 from the outer side in the transverse direction. In this case, the load transmitting block 21 is engaged with the guide pipe 72 with the end surface on the inner side in the transverse direction of the load transmitting block 21 abutting against the side wall 30 of the side frame portion 13c, and with the end surface on the inner side in the transverse direction of the ribs 75 abutting against the side surface 70e of the protruding portion 70. In addition, a notch portion 74 that exposes the front surface 70b including the mounting hole 70c of the protruding portion 70 when the load transmitting block 21 and the protruding portion 70 are engaged with each other is formed in the front surface side of the load transmitting block 21.

The load transmitting block 21 which has been fixed in position in the above-described manner protrudes from a position that is offset towards the rear side from the center in the front-rear direction of the side wall 30. Note that, in the present embodiment, the guide pipe 72 and the load transmitting block 21 constitute a load transmitting component. Note also that the closed cross-section structure portion H2, which includes the above-described inclined channel 28 and reinforcing plate 32, is located on the opposite side from the load transmitting component with the side frame portion 13c sandwiched between them.

As is shown in FIG. 2 and FIG. 9, a side airbag apparatus 51 for protecting a vehicle occupant is mounted on the side wall 30 of the side frame portion 13c in front of the load transmitting block 21.

As is shown in FIG. 9, the side airbag apparatus 51 is provided with an inflator 52 that generates gas when it senses an impact, and a folded up bag body 53 that receives the gas pressure from the inflator 52 and then unfolds. The side airbag apparatus 51 is mounted on the side frame portion 13c with the inflator 52 and the bag body 53 being housed in a bag case 54 that is provided with an openable lid portion.

As is shown in FIG. 3, the inflator 52 is provided with a circular cylinder-shaped main body portion 52a and a gas discharge aperture 52b, and the main body portion 52a is mounted on the side frame portion 13c so as to extend in the longitudinal direction of the side frame portion 13c. The inflator 52 is fastened in front of the load transmitting block 21 by screws or the like to a support plate 77 that is provided above the side frame portion 13c, and to the mounting hole 70c of the protruding portion 70.

The bag body 53 is located at a position on the outer side in the transverse direction of the gas discharge aperture 52b of the inflator 52 and facing the front surface 21a of the load transmitting block 21 (i.e., the front surface 70b of the protruding portion 70).

The bag body 53 is folded by being wound a plurality of times from the distal end side thereof towards the attached base portion side thereof into a roll shape in the direction of the inflator 52. Accordingly, when the bag body 53 receives the gas pressure from the inflator 52, the wound portion is released from the attached base portion side so as to smoothly unfold towards the outer side in the transverse direction and towards the front side of the vehicle body. At this time, because the bag body 53 faces the front surface 21a of the load transmitting block 21 (i.e., the front surface 70b of the protruding portion 70), with the direction of the unfolding being restricted by the front surface of the load transmitting block 21 to the front direction of the vehicle, the bag body 53 unfolds towards the front along the side wall of the vehicle body, namely, along the center pillar 11 and the door lining (not shown). Namely, the front surfaces 21a and 70b of the load transmitting block 21 and the protruding portion 70 form structural elements that serve as supporting surfaces for the bag body 53.

Note that the symbol 55 in FIG. 9 is a padding material that is placed around the seat back frame 13, the load transmitting block 21, and the side airbag apparatus 51, while the symbol 56 is a covering material that covers the outer surface of the padding material 55. In the case of the present embodiment, a slit-shaped aperture 57 that opens towards the outer side in the transverse direction is provided in the padding material 55, and the load transmitting block 21 and the side airbag apparatus 51 are placed inside this aperture 57. When the vehicle receives a collision from the side so that gas is supplied from the inflator 52 to the bag body 53, the bag body 53 flies through the aperture 57 towards the outside, and unfolds towards the front by breaking the covering material 56 on the side portion of the seat back 3.

Moreover, as is shown in FIG. 9, the airbag apparatus 51 that has been mounted on the side frame portion 13c with the bag body 53 folded inside it is set in a position inside the end portion on the outer side in the transverse direction of the vehicle seat 1 (i.e., on the inside of the distal end portion of the load transmitting block 21). Because of this, there is a surplus of space in the area on the outer side in the transverse direction in front of the load transmitting block 21, and this area is able to be used effectively.

Moreover, as is shown in FIG. 4, load transmitting blocks 38 and 39 are mounted respectively on the outer sides (i.e., the outer sides in the transverse direction) of the above-described reclining mechanism 18 at the bottom ends of the side frame portions 13c and 13d on both the left and right sides. In the same way as in the load transmitting block 21 located on the upper side, each of these load transmitting blocks 38 and 39 has a honeycomb structure in which a plurality of cylindrical cross-sections that extend in the transverse direction are arranged in parallel with each other. In addition, the load transmitting block 39 that is mounted on the side frame portion 13d on the inner side in the transverse direction faces a side surface of the console box 5, which is located in the center in the transverse direction.

According to the above described structure, when an impact load is input into the side portion of a vehicle body during a vehicle side collision, a sensor senses this impact, and the inflator 52 of the side airbag apparatus 51 generates a gas.

The gas that is generated by the inflator 52 is supplied to the bag body 53, and the bag body 53 ruptures the surface covering material 56 on the seat side portion and then expands towards the front from the side portion of the seat 1. As a result of this, the bag body 53 is unfolded between the vehicle occupant who is sitting in the seat 1 and the side wall of the vehicle body.

Moreover, if a portion of the vehicle side wall such as the center pillar 11 is deformed in the direction of the seat back 3 (i.e., towards the inner side in the transverse direction) in a vehicle side collision, the side wall comes into contact with the load transmitting blocks 21 and 38 at the side portion of the vehicle seat 1, and the load is input into these load transmitting blocks.

Firstly, when the load is input into the lower load transmitting block 38, the entire seat 1 moves in the direction of the inner side in the transverse direction, and the lower load transmitting block 39 on the inner side in the transverse direction comes into contact with the console box 5. At this time, the load is transmitted towards the inner side in the transverse direction via the closed cross-sectional structure portion H1, which is formed by the bottom channel 27 of the load pass plate 25 and the bottom frame portion 13b of the seat back frame 13. Thereafter, the load that has been transmitted to the closed cross-sectional structure portion H1 is transmitted from the end portion on the inner side in the transverse direction of the closed cross-sectional structure portion H1 to the bottom frame portion 13b, and is then transmitted via the bottom frame portion 13b to the side frame portion 13d on the inner side in the transverse direction. The load that has been transmitted to the side frame portion 13d is then transmitted via the load transmitting block 39 and the console box 5 to the floor panel 12. At this time, by forming the closed cross-sectional structure portion H1, the bending rigidity of the load path structure is improved, so that the deformation of the seat back frame 13 is suppressed and the impact load can be effectively transmitted to the console box 5.

When the impact load is input into the upper load transmitting block 21, this load is transmitted from the load transmitting block 21 directly side-on to the side frame portion 13c on the outer side in the transverse direction of the seat back frame 13.

The load that has been transmitted to the side frame portion 13c is then transmitted to the closed cross-sectional structure portion H2, which is formed by the inclined channel 28 and the reinforcing plate 32, and is then transmitted diagonally downwards as it moves towards the inner side in the transverse direction. Specifically, the load that has been transmitted to the closed cross-sectional structure portion H2 is transmitted to the closed cross-sectional structure portion H1 over the entire length of the closed cross-sectional structure portion H2 and the flat plate portion 29. The load that has been transmitted to the closed cross-sectional structure portion H1 is then transmitted from the end portion on the inner side in the transverse direction of the closed cross-sectional structure portion H1 to the bottom frame portion 13b, and is then transmitted via the bottom frame portion 13b to the side frame portion 13d on the inner side in the transverse direction. The load that has been transmitted to the side frame portion 13d is then transmitted via the load transmitting block 39 and the console box 5 to the floor panel 12.

In this manner, the impact load that is input into the load transmitting block 21 is received over substantially the entire area of the load pass plate 25, and after it has been dispersed throughout the entire area of the load pass plate 25, it is transmitted via the bottom frame portion 13b to the side frame 13d, which is located on the inner side. At this time, by forming the closed cross-sectional structure portions H1 and H2 between the side frame portions 13c and 13d, the bending rigidity of the load path structure is improved, so that the deformation of the seat back frame 13 can be suppressed. As a consequence, the impact load can be effectively transmitted to the console box 5.

Here, in the present embodiment, the load transmitting block 21 is engaged with the guide pipe 72, and is fixed in position such that it covers the box-shaped protruding portion 70. Because of this, even if an impact load is input into the load transmitting block 21, for example, from a direction diagonally forward of or a direction diagonally rearward of the vehicle body (i.e., from a direction that intersects the transverse direction), the load transmitting block 21 is able to transmit the load towards the inner side in the transverse direction without its own position being shifted.

In this manner, in the present embodiment, by mounting the load transmitting block 21 on the box-shaped protruding portion 70 that protrudes from the side frame portion 13c towards the outer side in the transverse direction, it is possible to fix the position of the load transmitting block 21 relative to the side frame portion 13c. As a result of this, because it is possible to suppress the movement of the load transmitting block 21, not only collision loads from directly side-on to the vehicle, but collision loads from diagonal directions and the like as well can be rapidly transmitted towards the inner side in the vehicle transverse direction irrespective of the input direction of the collision load. As a result, the efficiency of the load transmission to the seat back frame 13 can be improved.

Furthermore, because the load transmitting block 21 is engaged with the guide pipe 72, the positioning of the load transmitting block 21 relative to the side frame portion 13c can be easily achieved, so that any shifting in the position thereof when a collision load is input can be further suppressed.

Moreover, in the vehicle seat 1 according to the present embodiment, because the bag body 53 is placed in a position facing the front surfaces 21b and 70b of the load transmitting block 21 (i.e., the protruding portion 70), the front surfaces 21b and 70b form structural elements that serve as supporting surfaces for the bag body 53. Namely, because the reaction force when the bag body 53 is unfolded can be reliably received by the load transmitting block 21 (i.e., the protruding portion 70), an even faster unfolding of the bag body 53 can be achieved.

Hereinafter, a second embodiment of the present invention will be described based on the drawings.

Figure 10:
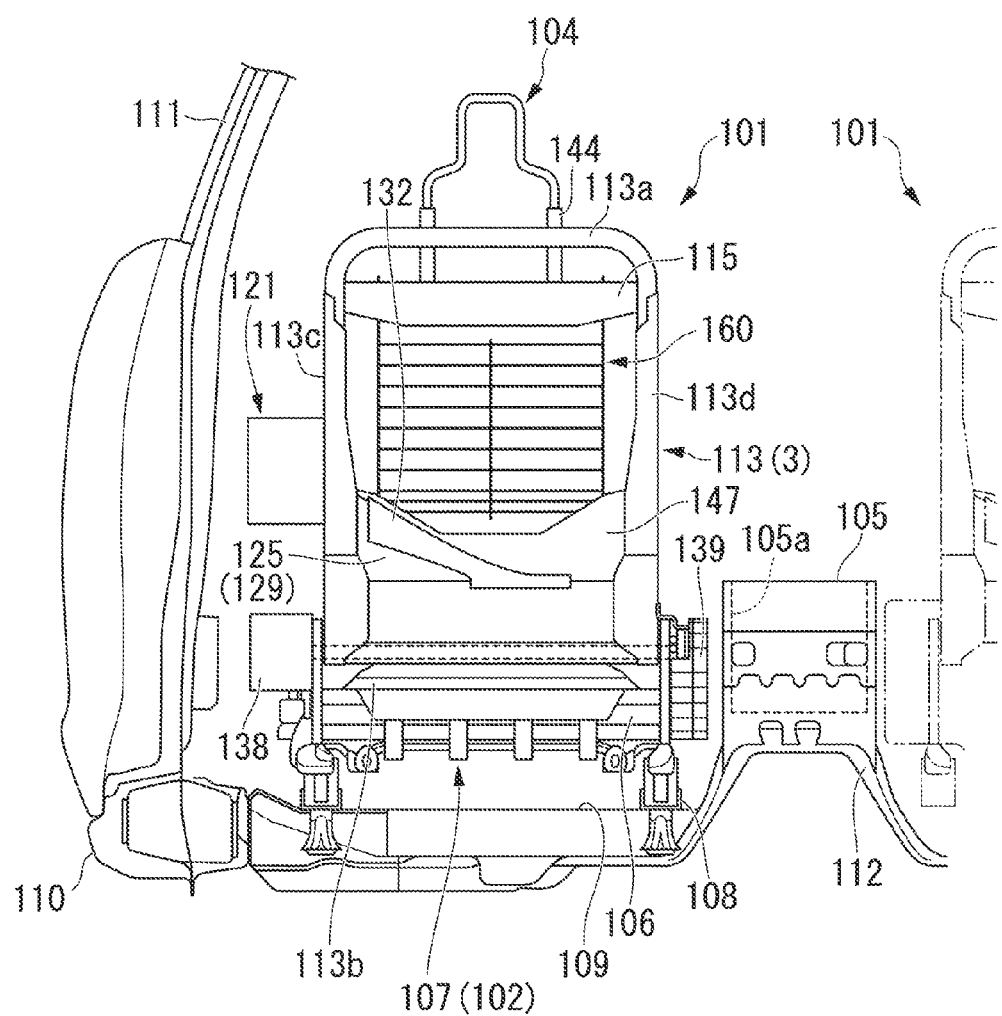
FIG. 10 is a rear view of a front vehicle seat on the left-hand side of a vehicle compartment according to a second embodiment of the present invention.

FIG. 10 is a rear view of a front seat on the left-hand side of a vehicle compartment. Note that in the drawings, the arrow FR indicates the front of the vehicle, while the arrow OUT indicates the outer side in the transverse direction of the vehicle.

As is shown in FIG. 10, a floor tunnel 112 that protrudes upwards is formed extending in the longitudinal direction of the vehicle body in a center portion in the vehicle transverse direction of a vehicle body floor 109. A pair of left and right front seats 101 and 101 are placed individually on both side portions of this floor tunnel 112.

Side sills 110 having a closed cross-sectional structure that are joined to both side edges of the vehicle body floor 109 are provided extending in the vehicle longitudinal direction on the vehicle compartment outer sides of the left and right seats 101 and 101. A bottom portion of a center pillar 111 is connected to each side sill 110. Here, in FIG. 10, in order to simplify the description, only the top framework portion of the seat 101 is shown (this also applies in the following drawings as well).

A console box 5 in whose top surface is provided a recessed storage portion 105a is fixed between the left and right seats 101 and 101 on top of the floor tunnel 112.

Figure 11:
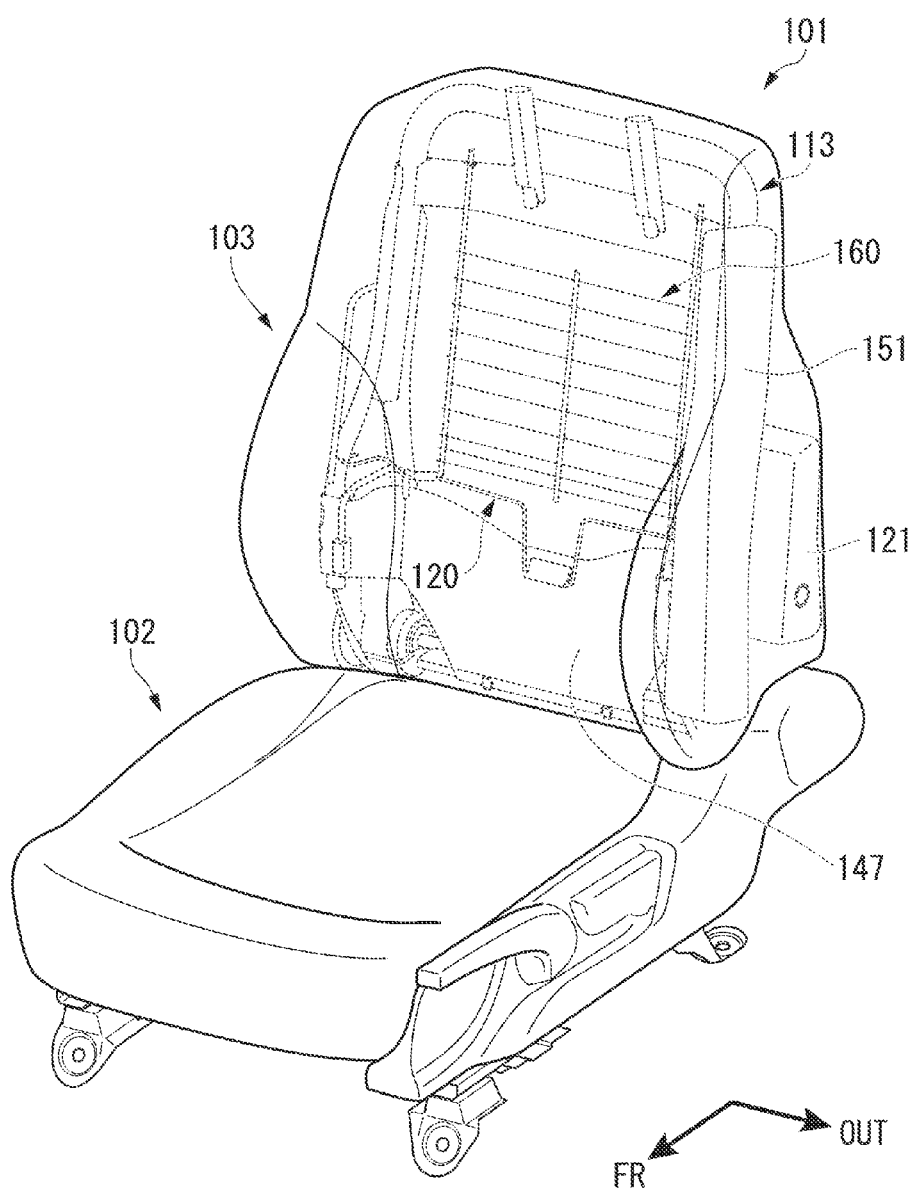
FIG. 11 is a perspective view looking from a direction diagonally in front showing a vehicle seat according to the same embodiment.
Figure 12:
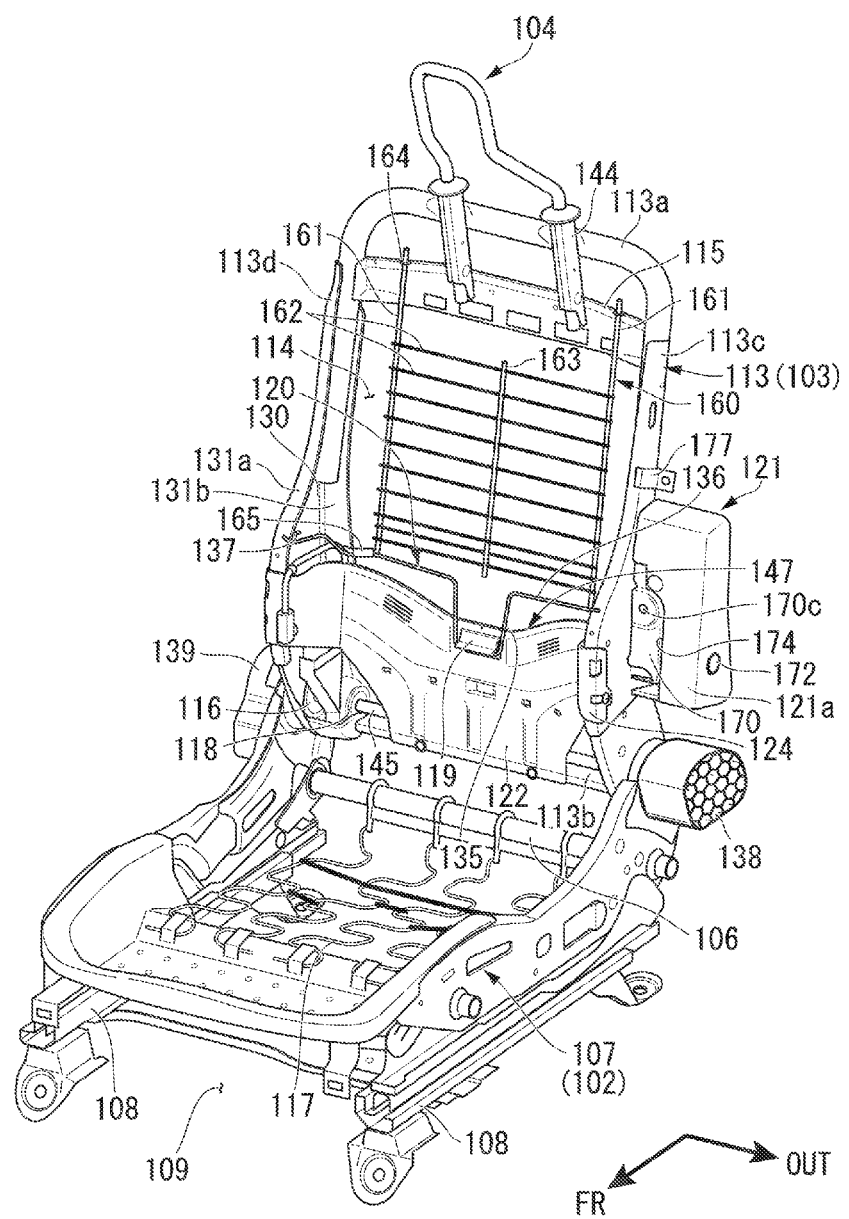
FIG. 12 is a perspective view looking from a direction diagonally in front showing framework portions of a vehicle seat according to the same embodiment.

FIG. 11 is a perspective view looking from a direction diagonally in front showing a vehicle seat 101 that is installed on the front seat side of a vehicle. FIG. 12 is a perspective view also looking, in the same way, from a direction diagonally in front and showing framework portions of this vehicle seat 101. Note that in the following description, unless specifically indicated otherwise, the transverse direction is the same direction as the vehicle transverse direction (i.e., the seat transverse direction).

As is shown in FIG. 11, the vehicle seat 101 is provided with a seat cushion 102 that supports the posterior of a vehicle occupant, a seat back 103 that is continuous with a rear end portion of the seat cushion 102 and that supports the hip and back portions of the vehicle occupant, and a headrest 104 that is supported on a top portion of the seat back 103 and that supports the head and neck portions of the vehicle occupant (only the framework is shown in FIG. 12).

As is shown in FIG. 12, the seat cushion 102 is provided with a seat cushion frame 107 to which is attached a rear cross member 106 that extends in the transverse direction at the rear end portion of the seat cushion frame 107. The seat cushion frame 107 is mounted via seat rails 108 and 108 such that it is able to slide backwards and forwards on the vehicle floor 109.

The seat cushion frame 107 is a component that is formed in a U shape, and left and right rear end portions thereof extend slightly diagonally upwards. Cushion springs 117 are stretched under tension inside the cushion seat frame 107 (see FIG. 12).

(Seat Back Frame Structure)

Figure 13:
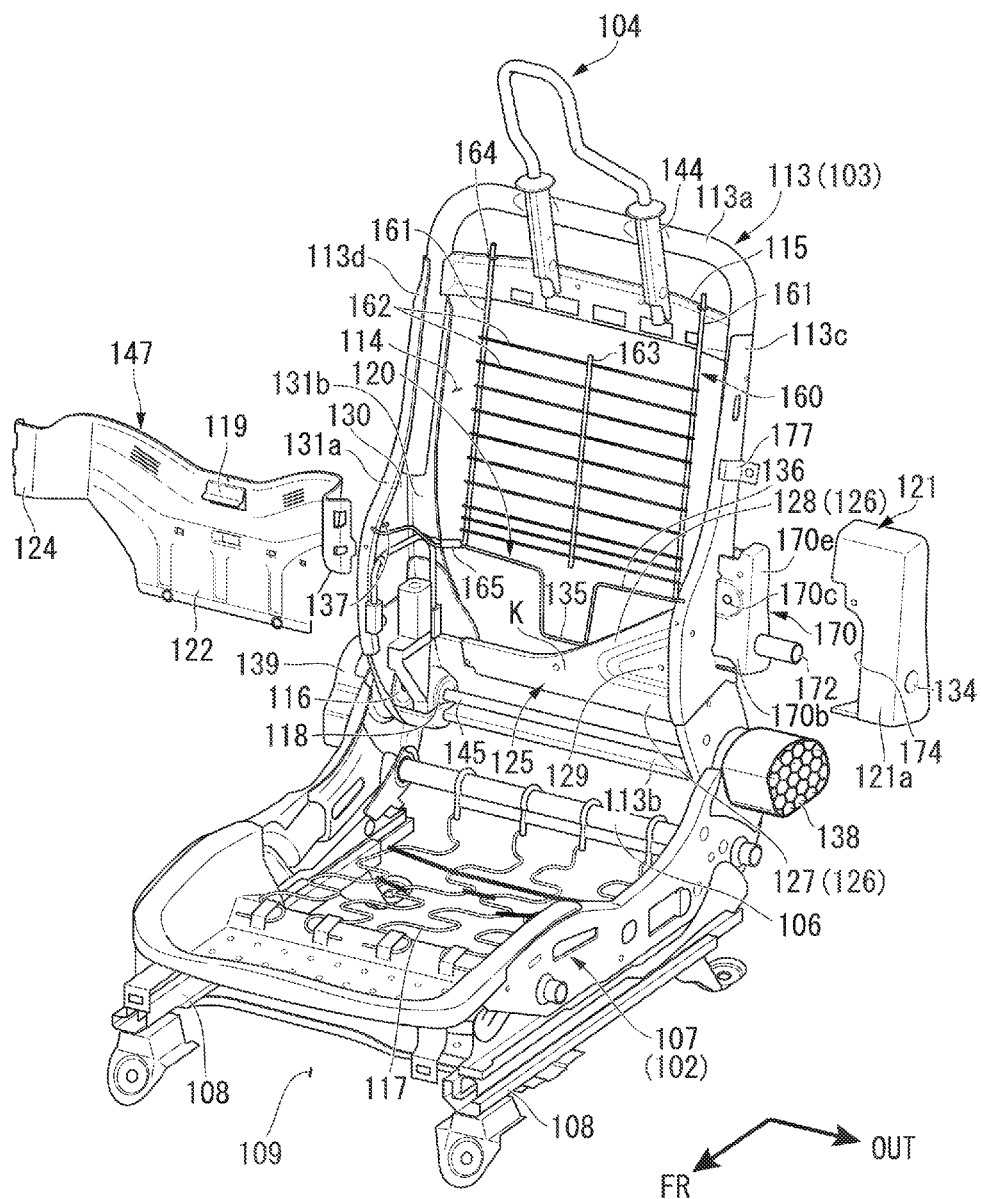
FIG. 13 is an exploded perspective view of framework portions of a seat back according to the same embodiment.

FIG. 13 is an exploded perspective view showing framework portions of the seat back 103.

As is shown in FIG. 12 and FIG. 13, the seat back 103 is provided with a substantially rectangular frame-shaped seat back frame 113 that is formed by a top frame portion 113a, left and right side frame portions 113c and 113d, and a bottom frame portion 113b. A bottom end of this seat back frame 113 is tiltably joined to a rear end portion of the seat cushion frame 107.

The top frame portion 113a is provided with a substantially U-shaped pipe component, and supporting pipes 144 that support the head rest 104 such that the head rest 104 can be raised or lowered are attached to the center of a top piece portion thereof that extends in the transverse direction. In addition, a top cross member 115 is provided on the top frame portion 113a so as to bridge the gap between both end sides in the transverse direction. The top cross member 115 curves from both sides in the transverse direction towards the rear in the center portion thereof, and base end sides of the aforementioned supporting pipes 144 are fixed thereto.

The left and right side frame portions 113c and 113d are provided with panel components whose cross-section in a horizontal direction is substantially U-shaped, and an area on the upper side thereof has a smaller front-rear width than a substantially central portion in the vertical direction thereof, while an area on the lower side thereof has a relatively larger front-rear width than the substantially central portion thereof. The areas on the upper side of the side frame portions 113c and 113d that have a narrower front-rear width are fixed by welding to their corresponding side pieces of the top frame portion 113a such that the U-shaped cross-section portions of the side frame portion 113c and 113d wrap around the side pieces of the top frame portion 113a from the outer side in the transverse direction. In addition, hinge portions 116 that are connected to the rear end portion of the seat cushion frame 107, and reclining mechanisms 118 that are used to adjust the tilt angle of the seat back frame 113 are attached to the bottom end sides of the side frame portions 113c and 113d. Note that the left and right reclining mechanisms 118 are connected by means of an operating rod 145 that extends in the transverse direction such that they are able to move in synchronization with each other.

The bottom frame portion 113b is provided with a panel component whose cross-section in a vertical direction is substantially S-shaped (see FIG. 17), and extends in a transverse direction such that a top half portion thereof surrounds the operating rod 145 from the rear side, while both end portions thereof are joined to bottom ends of the left and right side frame portions 113c and 113d.

In the left and right side frame portions 113c and 113d, a front wall 131a and a rear wall 131b that each bend inwards in the transverse direction are connected to the front and rear respectively of a side wall 130 that is located on the outer side in the transverse direction, and the side wall 130 portions are formed such that, as is described above, the width of the upper side above a substantially central portion becomes narrower, while the width of the lower side below the substantially central portion becomes wider. Specifically, in the side walls 130, the rear end side is formed substantially straight over the entire vertical length thereof, however, the front end side is formed substantially straight from the top portion thereof as far as the central area in a vertical direction, but from the central area downwards it curves so as to gradually protrude towards the front. Accordingly, a curved surface that follows the curved shape of the front-end side of the side wall 130 is provided in the front walls 131*a* of the side frame portions 113*c* and 113*d*.

Figure 14:
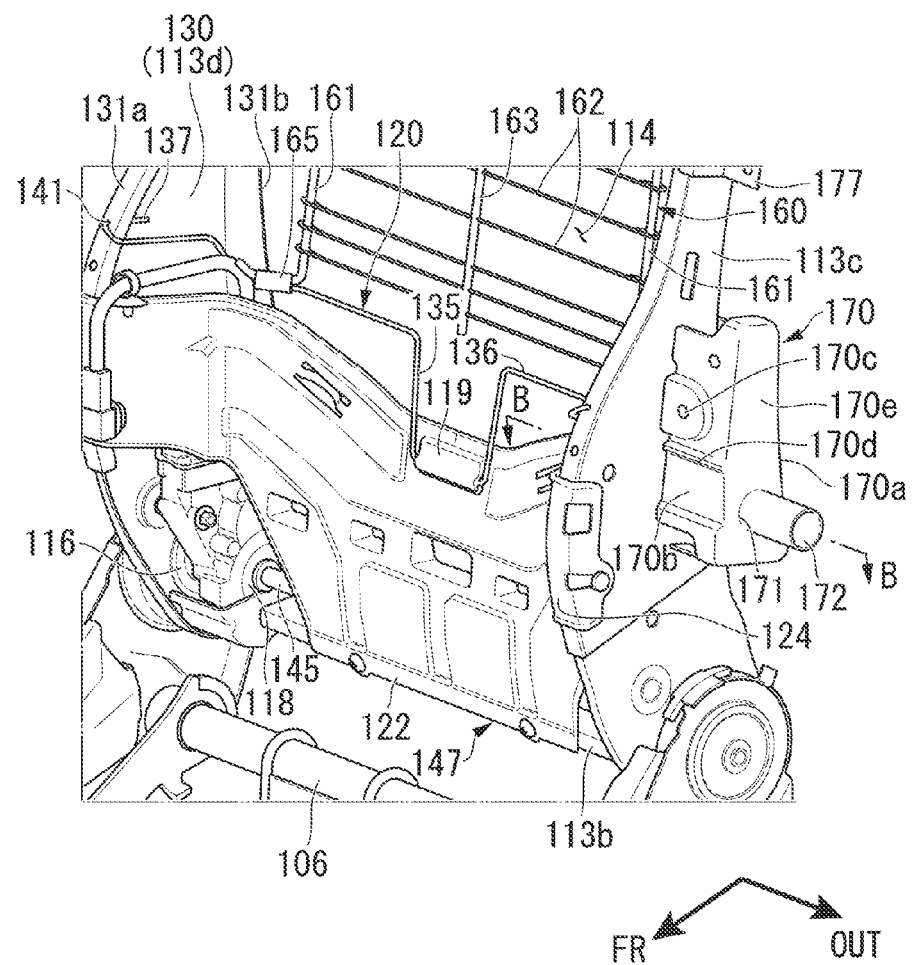
FIG. 14 is an enlarged perspective view of framework portions of a seat back according to the same embodiment.

FIG. 14 is an enlarged perspective view showing framework portions of the seat back 103.

As is shown in FIG. 12 through FIG. 14, a back pan 147 that is formed, for example, from resin as a three-dimensionally curved plate component is placed between the side frame portions 113*c* and 113*d*. Specifically, the back pan 147 has a pelvis supporting body 122 whose cross-section in a horizontal direction is formed in a U shape, and distal end portions 124 that extend from both sides of the pelvis supporting body 122 and that are formed so as to bend around from the front wall 131*a* side of the side frame portions 113*c* and 113*d* as far as the outer surface of the side walls 130.

The pelvis supporting body 122 extends across so as to bridge the gap between the side frame portions 113*c* and 113*d* at the rear portion side in the front-rear direction of the side frame portions 113*c* and 113*d*, and both sides thereof extend towards the front following the inside surfaces of the side walls 130 of the side frame portions 113*c* and 113*d*. Namely, the pelvis supporting body 122 supports the vehicle occupant when the vehicle occupant is sitting in the seat 101 by enveloping the vehicle occupant from the rear from the pelvic region down to the vicinity of the lower lumbar region. A bottom edge portion of the central portion in the transverse direction of the pelvis supporting body 122 is fastened by screws or the like to the bottom frame portion 113*b*.

Moreover, the distal end portions 124 are fastened by screws or the like to the outer surface sides of the side frame portions 113*c* and 113*d*.

(Load Pass Structure)

Figure 15:
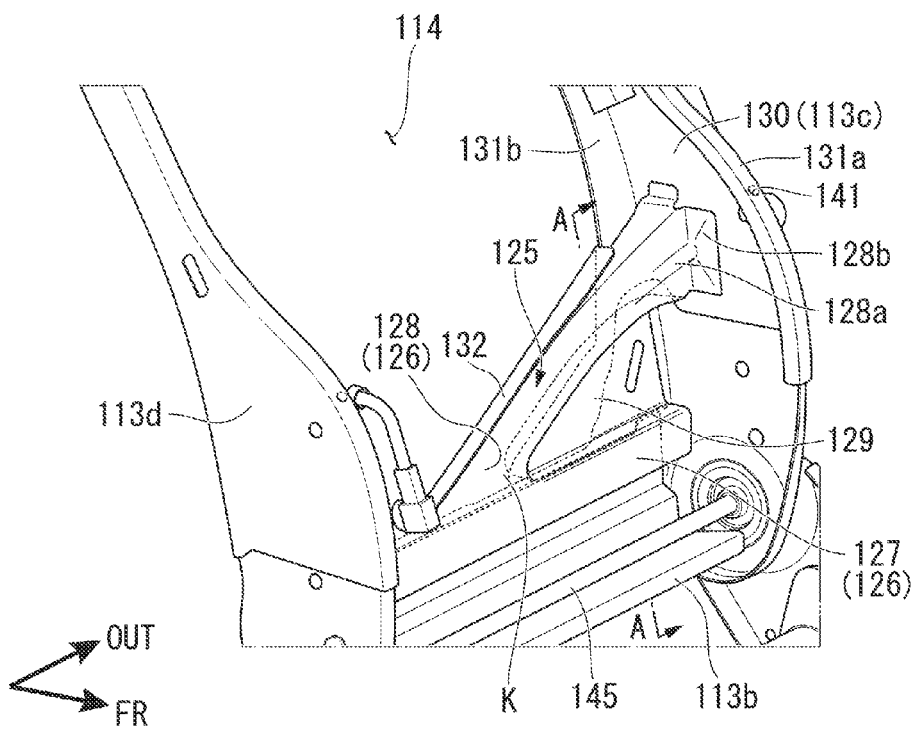
FIG. 15 is an enlarged perspective view of framework portions of a seat back from which a back pan has been removed according to the same embodiment.
Figure 16:
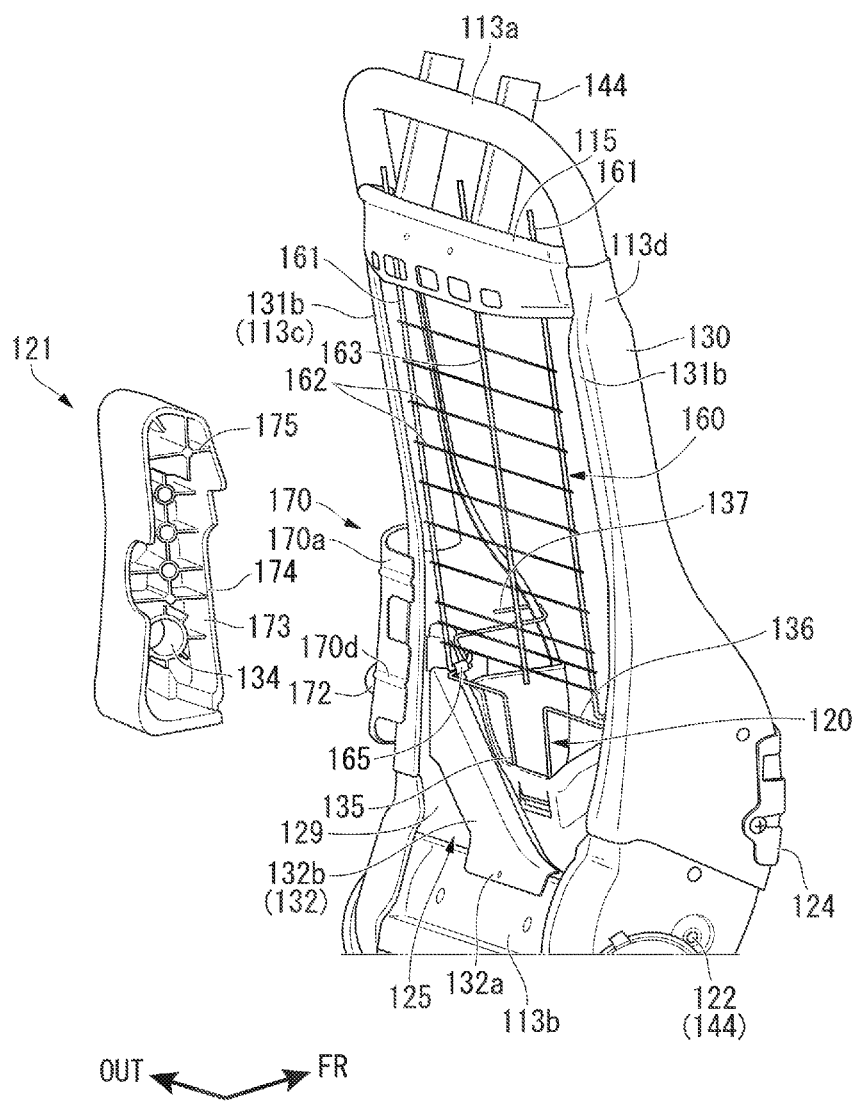
FIG. 16 is a perspective view looking from a rear surface side showing framework portions of a seat back according to the same embodiment.
Figure 17:
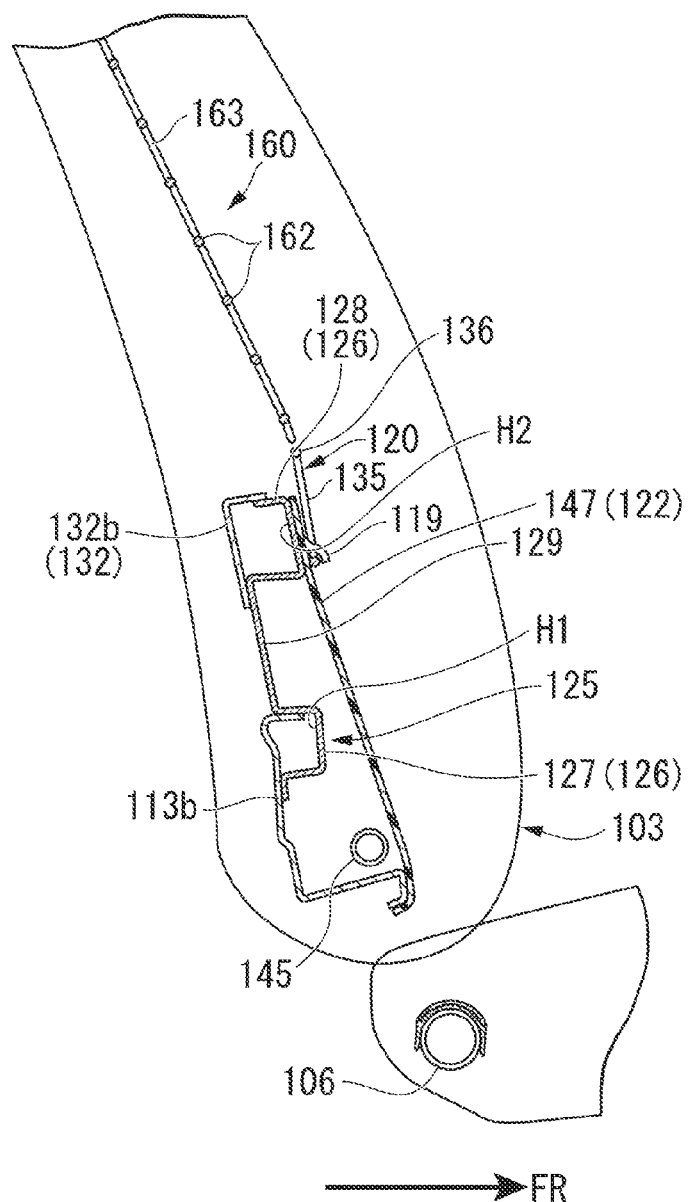
FIG. 17 is a cross-sectional view taken along a line A-A in FIG. 15.

FIG. 15 is an enlarged perspective view showing framework portions of the seat back 103 from which the back pan 147 has been removed. FIG. 16 is a perspective view showing the seatback 103 from the rear surface side thereof. FIG. 17 is a cross-sectional view taken along a line A-A in FIG. 15.

As is shown in FIG. 15 and FIG. 16, a load pass plate 125 (i.e., a supporting plate) is provided between the back pan 147 and the bottom frame portion 113*b* in the front-rear direction such that it overlaps with the back pan 147 in the front-rear direction. The load pass plate 125 is made, for example, from metal and is formed substantially in a triangular shape when viewed from the front-rear direction. Specifically, the load pass plate 125 is provided with a channel portion 126 whose cross-section in a vertical direction is formed in a U shape, and that extends substantially in a Y shape when viewed from the front-rear direction. Specifically, the channel portion 126 is provided with a bottom channel 127 whose cross-section is formed in a U shape and that is formed so as to bridge the gap between the side frame portions 113*c* and 113*d*, and with an inclined channel (i.e., an inclination reinforcing portion) 128 whose cross-section is formed in a U shape and that splits off from the bottom channel 127 at a point partway along the lengthwise direction thereof.

As is shown in FIG. 13, FIG. 15, and FIG. 16, the bottom channel 127 is placed such that the aperture portion of the U-shaped cross-section faces towards the rear, and such that it engages with the top half portion of the bottom frame portion 113*b*, and the entire lengths of the bottom edge portion and top edge portion thereof are fixed by welding to the bottom frame portion 113*b*. Specifically, the top edge portion of the bottom channel 127 is fixed to the top edge portion of the bottom frame portion 113*b*, and the bottom edge portion of the bottom channel 127 is fixed to the front surface of the bottom frame portion 113*b*. As a result, the bottom channel 127 and the bottom frame portion 113*b* form a closed cross-sectional structure portion H101 that has a rectangular-shaped cross-section and that extends in the transverse direction between the side frame portions 113*c* and 113*d*, and that contributes to the load transmission between the side frame portions 113*c* and 113*d*.

Moreover, an end portion on the outer side in the transverse direction of the bottom channel 127 is fixed by welding to the inner surface of the side wall 130 of the side frame portion 113*c*, while an end portion on the inner side in the transverse direction of the bottom channel 127 has a small gap between itself and the inner surface of the side wall 130 of the side frame portion 113*d*. Specifically, the end portion on the inner side in the transverse direction of the bottom channel 127 extends further to the inner side than the central portion in the transverse direction of the bottom frame portion 113*b*, and is formed as far as a position where it overlaps with the rear wall 131*b* of the side frame portion 113*d* when viewed from the front-rear direction. Namely, the bottom channel 127 and the bottom frame portion 113*b* are connected together over substantially the entire length in the transverse direction of the bottom frame portion 113*b*. Because of this, the end portion on the outer side in the transverse direction of the above-described closed cross-sectional structure portion H101 as well also abuts against the inner surface of the side wall 130 of the side frame portion 113*c*, while the end portion on the inner side in the transverse direction thereof has a slight gap between itself and the inner surface of the side wall 130 of the side frame portion 113*d*. The bottom channel 127 and bottom frame portion 113*b* are connected together over a range that extends from the end portion on the outer side in the transverse direction of the bottom frame portion 113*b* as far as the inner side beyond the central portion in the transverse direction of the bottom frame portion 113*b*. The bottom channel 127 and the bottom frame portion 113*b* overlap in such a manner that the entire length in the transverse direction of the bottom end of the bottom channel 127 overlaps in the front-rear direction with the bottom frame portion 113*b*.

The inclined channel 128 is formed so as to continue on from the bottom channel 127, and extends diagonally upwards as it moves outwards in the transverse direction from the position K where it branches off from the bottom channel 127. An attachment piece 128*b* (see FIG. 15) that is bent outwards is formed on an end portion on the outer side in the transverse direction of the inclined channel 128, and this attachment piece 128*b* is fixed to the inner surface of the side wall 130 of the side frame portion 113*c*.

In this case, the end surface on the outer side in the transverse direction of the inclined channel 128 is located opposite a load transmitting block 121 (described below) with the side frame portion 113*c* sandwiched between them. The inclined channel 128 is formed such that the width thereof increases as it moves outwards in the transverse direction, and a bead 128*a* that bulges outwards is formed in a circumferential surface of the inclined channel 128.

Moreover, a flat plate portion 129 is formed between the bottom channel 127 and the top channel 128 integrally with the respective channels 127 and 128 so as to span across an area enclosed by the top edge portion of the bottom channel 127 and the bottom edge portion of the inclined channel 128. As a result of this, the inclined channel 128 and the bottom frame portion 113*b* are connected over the entire length in the lengthwise direction of the inclined channel 128 via the bottom channel 127 and the flat plate portion 129.

Moreover, a reinforcing plate 132 is provided on the rear surface side of the load pass plate 125 so as to cover an aperture portion of the inclined channel 128. The reinforcing plate 132 is a plate component whose cross-section in a vertical direction is formed in an L shape, and that is formed such that a top side thereof circles around as far as the top edge portion of the inclined channel 128. Specifically, the reinforcing plate 132 is provided with a base portion 132a (see FIG. 16) whose base end portion is fixed by welding to the rear surface of the bottom frame portion 113b, and with an inclined portion 132b that inclines so as to follow the inclined channel 128 as it moves towards the outer side in the transverse direction from the base portion 132a. The top edge portion of the inclined portion 132b is fixed by welding across the entire length of the top edge portion of the inclined channel 128, and the bottom edge portion thereof is fixed by welding to the rear surface of the flat plate portion 129. As a result of this, the reinforcing plate 132 and the inclined channel 128 form a closed cross-sectional structure portion H102 (see FIG. 17) that has a rectangular cross-section and that extends diagonally upwards as it moves from the branch position K outwards in the transverse direction, and that contributes to the load transmission between the side frame portions 113c and 113d.

Namely, in the present embodiment, between the side frame portions 113c and 113d there are provided the closed cross-sectional structure portion H101, which extends in the transverse direction, and the closed cross-sectional structure portion H102, which branches off from the closed cross-sectional structure portion H101 and which is inclined diagonally upwards as it moves outwards in the transverse direction, and the two closed cross-sectional structure portions H101 and H102 are provided in the vertical direction on the outer side in the transverse direction of the seat 101. Note that a load pass structure is formed by the load pass plate 125, the bottom frame portion 113b and the reinforcing plate 132.

(Planar Elastic Body and Supporting Body Wire)

Here, as is shown in FIG. 12 and FIG. 14, supporting body wires 120 and a planar elastic body 160 are provided in an aperture portion 114 that is open in the front-rear direction between the back pan 147 and the top cross member 115 so as to bridge the gap between the back pan 147 and the top cross member 115.

Firstly, the supporting body wire 120 is a metal wire that has been bent, for example, into a crank shape, and is provided so as to elastically bridge the gap between a hook 119 that is formed in the pelvis supporting body 122 of the back pan 147 and the side frame portions 113c and 113d. Specifically, the supporting body wire 120 is provided with an engaging portion 135 (see FIG. 13) that engages with the hook 119 of the back pan 147, extended portions 136 that extend in the transverse direction from both ends of the engaging portion 135, and folded back portions 137 (see FIG. 14) that are formed at the distal ends of the extended portions 136 and are linked to each of the side frame portions 113c and 113d.

Note that the above-described hook 119 of the back pan 147 is a tongue-shaped component that is formed by cutting open the top portion of the pelvis supporting body 122, and that extends in a downward direction.

The engaging portion 135 is bent substantially in a U shape that is open towards the top, and the bottom side portion thereof is engaged with the hook 119 of the back pan 147, while both ends of this bottom side portion are each bent in an upward direction.

Base end sides of the extended portions 136 extend respectively from the two ends of the engaging portion 135 towards the side frame portions 113c and 113d, and distal end sides thereof are bent towards the front and then extend along the internal surfaces of the side walls 130 of the side frame portions 113c and 113d.

The folded back portions 137 are formed such that the distal end sides of the extended portions 136 are folded back towards the rear, and encircle around the front walls 131a of the side frame portions 113c and 113d and are then inserted into through holes 141 that are formed in the front walls 131a. As a result, the two ends of the supporting body wire 120 are linked to the supporting frame portions 113c and 113d.

The planar elastic body 160 that elastically bridges the gap between the supporting body wire 120 and the top portion cross member 115 is provided in the aperture portion 114 between the supporting body wire 120 and the above-described top portion cross member 115. The planar elastic body 160 is provided with wires that are made of metal or the like and are stretched in a lattice shape between the top portion cross member 115 and the supporting body wire 120. Namely, the planar elastic body 160 is provided with a pair of bolster wires 161 that extend across the gap between the top portion cross member 115 and the supporting body wire 120, a plurality of stringer wires 162 that extend between the bolster wires 161, and a connecting wire 163 that joins the respective stringer wires 162 together in a group.

The respective bolster wires 161 extend in parallel with each other in a vertical direction at both sides in the transverse direction of the seat 101. A top end portion of each bolster wire 161 is inserted respectively into one of a pair of attaching pieces 164 that are formed in the top portion cross member 115, and is fixed therein. In contrast, bottom end portions of each bolster wire 161 are bundled by a binding tool 165 together with the respective extended portions 136 of the supporting body wire 120. At this time, the bolster wire 161 and the supporting body wire 120 are bundled inside the binding tool 165 such that they are able to pivot around the respective axes of the wires 120 and 161.

Each stringer wire 162 extends in the transverse direction, and each of the two end portions thereof is wound respectively around one of the bolster wires 161 and is fixed thereto. The respective stringer wires 162 are arranged in parallel with each other in the vertical direction, and the pitch between each stringer wire 162 is set such that this pitch is narrower at the bottom than at the top. Because of this, the rigidity of the planar elastic body 160 is set such that it becomes higher in stages moving from the top towards the bottom.

The connecting wire 163 extends in parallel with the bolster wires 161, and it is placed such that it links together central portions of the respective stringer wires 162 in the lengthwise direction thereof.

The wire diameter of the wires 161 through 163 is formed narrower than the wire diameters of the above-described supporting body wire 120. Because of this, the rigidity of the planar elastic body 160 is set lower than that of the supporting body wire 120. Namely, the aperture portion 114 of the seat back frame 113 of the present embodiment is bridged by the supporting body wire 120 and the planar elastic body 160, and the rigidity thereof is set such that it becomes sequentially lower in stages as it moves from the plate-shaped back pan 147 to the supporting body wire 120, and then to the planar elastic body 160.

(Load Transmitting Component)

Figure 18:
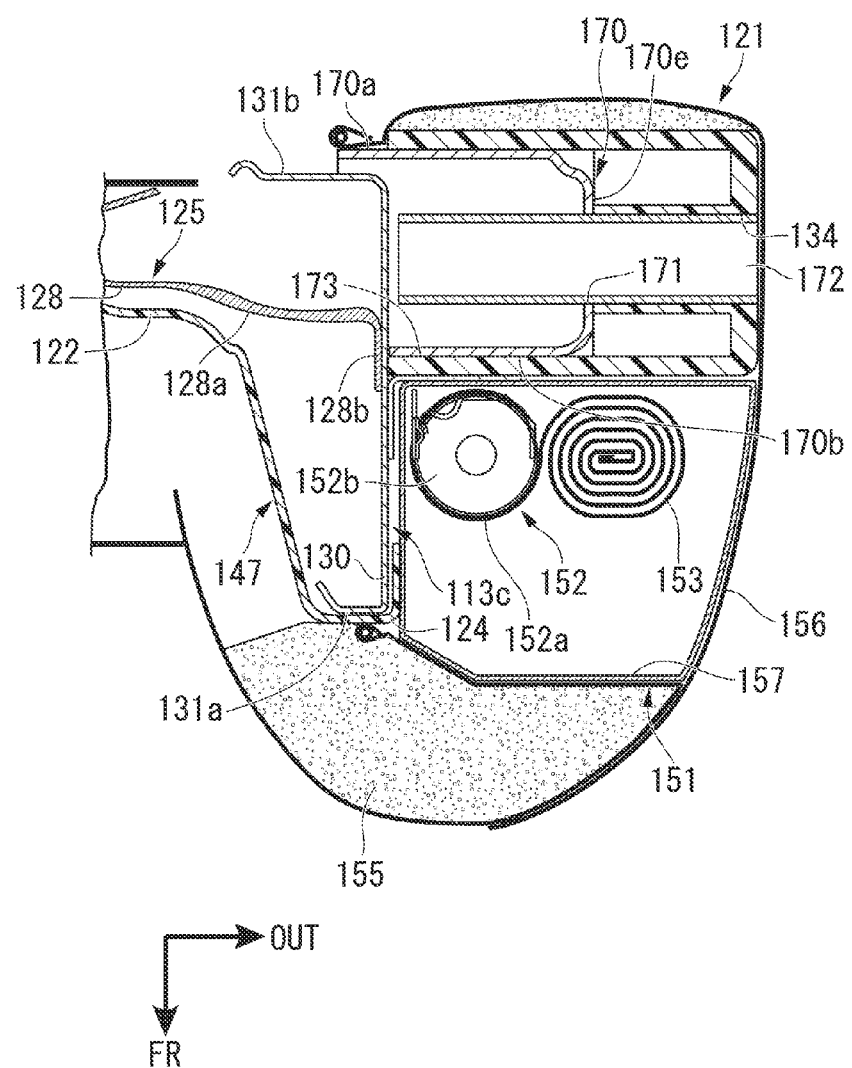
FIG. 18 is a cross-sectional view taken along a line B-B in FIG. 14.

FIG. 18 is a cross-sectional view taken along a line B-B in FIG. 14.

As is shown in FIG. 14, FIG. 16, and FIG. 18, a protruding portion 170 that protrudes towards the outer side in the transverse direction is provided on the side wall 130 on the outer side in the transverse direction of the side frame portion 113c. The protruding portion 170 is formed in a hollow box shape that is open towards the inner side in the transverse direction. A rear surface 170a of this protruding portion 170 is formed longer in the transverse direction than a front surface 170b thereof. Namely, while a distal end portion of the front surface 170b abuts against a central portion in the front-rear direction of the side wall 130 of the side frame portion 113c, the distal end portion of the rear surface 170a continues on to the rear wall 131b side of the side frame portion 113c and is joined to the side frame portion 113c. Moreover, a mounting hole 170c that is used to mount a side airbag apparatus 151 (described below) is formed in the front surface 170b of the protruding portion 170. Note that a bead 170d that extends in the transverse direction is formed on the outer circumferential surface of the protruding portion 170, and is provided in order to limit any buckling of the protruding portion 170.

A through hole 171 is formed in a side surface 170e of the protruding portion 170, and a cylindrical guide pipe 172 is inserted into this through hole 171 and is then welded in place. Namely, the guide pipe 172 extends in the transverse direction. Note that a slight gap is left between the end surface in the axial direction of the guide pipe 172 and the side wall 130 of the side frame portion 113c.

As is shown in FIG. 13, FIG. 16, and FIG. 18, the load transmitting block 121 is fixed in a state of engagement with the guide pipe 172. The load transmitting block 121 is a component that transmits to the side frame portion 113c any impact load that is input into the side wall of the vehicle body during a side collision of the vehicle. The load transmitting block 121 is formed with the cylindrical cross-section thereof divided into honeycomb structures that are arranged in parallel with each other by a plurality of internal ribs 175 that extend in the transverse direction, and the overall shape of the block 121 is a rectangular shape that is elongated in the vertical direction and is formed from resin. Moreover, the load transmitting block 121 is provided with an engaging hole 134 with which the guide pipe 172 that protrudes from the side frame portion 113c is engaged. When the guide pipe 172 has been engaged inside the engagement hole 134, the load transmitting block 121 is fastened to the protruding portion 170 by means of screws or the like.

Furthermore, a housing portion 173 that receives the above-described protruding portion 170 is formed on the inner side of the load transmitting block 121. As a result, the load transmitting block 121 is mounted so as to cover the protruding portion 170 from the outer side in the transverse direction. In this case, the load transmitting block 121 is engaged with the guide pipe 172 with the end surface on the inner side in the transverse direction of the load transmitting block 121 abutting against the side wall 130 of the side frame portion 113c, and with the end surface on the inner side in the transverse direction of the ribs 175 abutting against the side surface 170e of the protruding portion 170. In addition, a notch portion 174 that exposes the front surface 170b including the mounting hole 170c of the protruding portion 170 when the load transmitting block 121 and the protruding portion 170 are engaged with each other is formed in the front surface side of the load transmitting block 121.

The load transmitting block 121 which has been fixed in position in the above-described manner protrudes from a position that is offset towards the rear side from the center in the front-rear direction of the side wall 130. Note that, in the present embodiment, the guide pipe 172 and the load transmitting block 121 constitute a load transmitting component. Note also that the closed cross-section structure portion H102, which is formed by the above-described inclined channel 128 and reinforcing plate 132, is located on the opposite side from the load transmitting component with the side frame portion 113c sandwiched between them.

As is shown in FIG. 11 and FIG. 18, a side airbag apparatus 151 for protecting a vehicle occupant is mounted on the side wall 130 of the side frame portion 113c in front of the load transmitting block 121.

As is shown in FIG. 18, the side airbag apparatus 151 is provided with an inflator 152 that generates gas when it senses an impact, and a folded up bag body 153 that receives the gas pressure from the inflator 152 and then unfolds. The side airbag apparatus 151 is mounted on the side frame portion 113c with the inflator 152 and the bag body 153 being housed in a bag case 154 that is provided with an openable lid portion.

As is shown in FIG. 12, the inflator 152 is provided with a circular cylinder-shaped main body portion 152a and a gas discharge aperture 152b, and the main body portion 152a is mounted on the side frame portion 113c so as to extend in the longitudinal direction of the side frame portion 113c. The inflator 152 is fastened in front of the load transmitting block 121 by screws or the like to a support plate 177 that is provided above the side frame portion 113c, and to the mounting hole 170c of the protruding portion 170.

The bag body 153 is located at a position on the outer side in the transverse direction of the gas discharge aperture 152b of the inflator 152 and facing the front surface 121a of the load transmitting block 121 (i.e., the front surface 170b of the protruding portion 170).

The bag body 153 is folded by being wound a plurality of times from the distal end side thereof towards the attached base portion side thereof into a roll shape in the direction of the inflator 152. Accordingly, when the bag body 153 receives the gas pressure from the inflator 152, the wound portion is released from the attached base portion side so as to smoothly unfold towards the outer side in the transverse direction and towards the front side of the vehicle body. At this time, because the bag body 153 faces the front surface 121a of the load transmitting block 121 (i.e., the front surface 170b of the protruding portion 170), with the direction of the unfolding being restricted by the front surface of the load transmitting block 121 to the front direction of the vehicle, the bag body 153 unfolds towards the front along the side wall of the vehicle body, namely, along the center pillar 111 and the door lining (not shown). Namely, the front surfaces 121a and 170b of the load transmitting block 121 and the protruding portion 170 form structural elements that serve as supporting surfaces for the bag body 153.

Note that the symbol 155 in FIG. 18 is a padding material that is placed around the seat back frame 113, the load transmitting block 121, and the side airbag apparatus 151, while the symbol 156 is a covering material that covers the outer surface of the padding material 155. In the case of the present embodiment, a slit-shaped aperture 157 that opens towards the outer side in the transverse direction is provided in the padding material 155, and the load transmitting block 121 and the side airbag apparatus 151 are placed inside this aperture 157. When the vehicle receives a collision from the side so that gas is supplied from the inflator 152 to the bag body 153, the bag body 153 flies through the aperture 157 towards the outside, and unfolds towards the front by breaking the covering material 156 on the side portion of the seat back 103.

Moreover, as is shown in FIG. 18, the airbag apparatus 151 that has been mounted on the side frame portion 113c with the bag body 153 folded inside it is set in a position inside the end portion on the outer side in the transverse direction of the vehicle seat 101 (i.e., on the inner side of the distal end portion of the load transmitting block 121). Because of this, there is a surplus of space in the area on the outer side in the transverse direction in front of the load transmitting block 121, and this area is able to be used effectively.

Moreover, as is shown in FIG. 13, load transmitting blocks 138 and 139 are mounted respectively on the outer sides (i.e., the outer sides in the transverse direction) of the above-described reclining mechanism 118 at the bottom ends of the side frame portions 113c and 113d on both the left and right sides. In the same way as in the load transmitting block 121 located on the upper side, each of these load transmitting blocks 138 and 139 has a honeycomb structure in which a plurality of cylindrical cross-sections that extend in the transverse direction are arranged in parallel with each other. In addition, the load transmitting block 139 that is mounted on the side frame portion 113d on the inner side in the transverse direction faces a side surface of the console box 105, which is located in the center in the transverse direction.

According to the above described structure, when an impact load is input into the side portion of a vehicle body during a vehicle side collision, a sensor senses this impact, and the inflator 152 of the side airbag apparatus 151 generates a gas.

The gas that is generated by the inflator 152 is supplied to the bag body 153, and the bag body 153 ruptures the surface covering material 156 on the seat 101 side portion and then expands towards the front from the side portion of the seat 101. As a result of this, the bag body 153 is unfolded between the vehicle occupant who is sitting in the seat 101 and the side wall of the vehicle body.

At this time, in the vehicle seat 101 of the present embodiment, because the bag body 153 is placed in a position facing the front surfaces 121b and 170b of the load transmitting block 121 (i.e., the protruding portion 170), the front surfaces 121b and 170b form structural elements that serve as supporting surfaces for the bag body 153. Namely, because the reaction force when the bag body 153 is unfolded can be reliably received by the load transmitting block 121 (i.e., the protruding portion 170), an even faster unfolding of the bag body 153 can be achieved.

Moreover, if a portion of the vehicle side wall such as the center pillar 111 is deformed in the direction of the seat back 103 (i.e., towards the inner side in the transverse direction) in a vehicle side collision, the side wall comes into contact with the load transmitting blocks 121 and 138 at the side portion of the vehicle seat 101, and the load is input into these load transmitting blocks.

Firstly, when the load is input into the lower load transmitting block 138, the entire seat 101 moves in the direction of the inner side in the transverse direction, and the lower load transmitting block 139 on the inner side in the transverse direction comes into contact with the console box 105. At this time, the load is transmitted towards the inner side in the transverse direction via the closed cross-sectional structure portion H101, which is formed by the bottom channel 127 of the load pass plate 125 and the bottom frame portion 113b of the seat back frame 113. Thereafter, the load that has been transmitted to the closed cross-sectional structure portion H101 is transmitted from the end portion on the inner side in the transverse direction of the closed cross-sectional structure portion H101 to the bottom frame portion 113b, and is then transmitted via the bottom frame portion 113b to the side frame portion 113d on the inner side in the transverse direction. The load that has been transmitted to the side frame portion 113d is then transmitted via the load transmitting block 139 and the console box 105 to the floor panel 112. At this time, by forming the closed cross-sectional structure portion H101, the bending rigidity of the load path structure is improved, so that the deformation of the seat back frame 113 is suppressed and the impact load can be effectively transmitted to the console box 105.

When the impact load is input into the upper load transmitting block 121, this load is transmitted from the load transmitting block 121 directly side-on to the side frame portion 113c on the outer side in the transverse direction of the seat back frame 113.

The load that has been transmitted to the side frame portion 113c is then transmitted to the closed cross-sectional structure portion H102, which is formed by the inclined channel 128 and the reinforcing plate 132, and is subsequently transmitted diagonally downwards as it moves towards the inner side in the transverse direction. Specifically, the load that has been transmitted to the closed cross-sectional structure portion H102 is transmitted to the closed cross-sectional structure portion H101 over the entire length of the closed cross-sectional structure portion H102 and the flat plate portion 129. The load that has been transmitted to the closed cross-sectional structure portion H101 is then transmitted from the end portion on the inner side in the transverse direction of the closed cross-sectional structure portion H101 to the bottom frame portion 113b, and is then transmitted via the bottom frame portion 113b to the side frame portion 113d on the inner side in the transverse direction. The load that has been transmitted to the side frame portion 113d is then transmitted via the load transmitting block 139 and the console box 105 to the floor panel 112.

In this manner, the impact load that is input into the load transmitting block 121 is received over substantially the entire area of the load pass plate 125, and after it has been dispersed throughout the entire area of the load pass plate 125, it is transmitted via the bottom frame portion 113b to the side frame 113d, which is located on the inner side. At this time, by forming the closed cross-sectional structure portions H101 and H102 between the side frame portions 113c and 113d, the bending rigidity of the load path structure is improved, so that the deformation of the seat back frame 113 can be suppressed.

As a consequence, the impact load can be effectively transmitted to the console box 105.

Here, in the present embodiment, the load transmitting block 121 is engaged with the guide pipe 172, and is fixed in position such that it covers the box-shaped protruding portion 170. Because of this, even if an impact load is input into the load transmitting block 121, for example, from a direction diagonally forward of or a direction diagonally rearward of the vehicle body (i.e., from a direction that intersects the transverse direction), the load transmitting block 121 is able to transmit the load towards the inner side in the transverse direction without its own position being shifted.

In the present embodiment, by connecting the load pass plate 125 (i.e., the bottom channel 127) and the bottom frame portion 113b together over substantially their entire lengths in the transverse direction, an impact load that is input into the load pass plate 125 via the load transmitting components is received by substantially the entire length of the load pass structure, and is dispersed over substantially the entire length of the load pass structure. Thereafter, this impact load is transmitted to the inner-side side frame portion 113d via the bottom frame portion 113b.

As a result, collision loads can be rapidly transmitted towards the inner side in the vehicle transverse direction, and the efficiency of the load transmission to the seat back frame 113 can be improved. In this case, because the load transmission efficiency can be improved, it is not necessary to make the make the plate thickness and the like of the load pass structure (i.e., of the load pass plate 125 and the like) thicker in order to ensure bending rigidity. Because of this, it is possible to provide a load pass structure having a simple structure in which the plate thickness is comparatively thin and in which a reduction in weight has been achieved.

Moreover, by providing the reinforcing plate 132 on the rear surface side of the inclined channel 128 such that it covers the aperture portion of the inclined channel 128, it is possible to improve the bending rigidity of the inclined channel 128, and to suppress deformation of the seat back frame 113.

Furthermore, according to the present embodiment, by placing the above-described closed cross-sectional structure portion H102 on the opposite side of the load transmitting component such that the side frame portion 113c is sandwiched between them, a collision load that is input into the side frame portion 113c via the load transmitting component can be efficiently transmitted to the load pass structure. As a result, it is possible to further improve the load transmission efficiency to the seat back frame 113.

Note that the present invention is not limited to the above-described embodiments and various design modifications and the like may be made insofar as they do not depart from the spirit or scope of the present invention.

For example, in the above-described first embodiment, a structure in which the upper load transmitting block 21 is assembled together with the box-shaped protruding portion 70 is described, however, it is also possible to employ a structure in which the lower load transmitting block 38 is assembled together with a box-shaped protruding portion.

Moreover, for example, in the above-described second embodiment, a structure in which the upper load transmitting block 121 is assembled together with the box-shaped protruding portion 170 is described, however, it is also possible to employ a structure in which the lower load transmitting block 138 is assembled together with a box-shaped protruding portion.

Moreover, the range over which the load pass filter 125 (i.e., the bottom channel 127) and the bottom frame portion 113b are connected may be suitably altered provided that the entire length in the transverse direction of the bottom end of the bottom channel 127 is superimposed in the longitudinal direction with the bottom frame portion 113b. It is even better if the connection range is on the inner side of the center portion in the transverse direction of the bottom frame portion 113b, and, in this case, it is also possible for both ends of the bottom channel 127 to be fixed such that they span the gap between the side frame portions 113c and 113d.

INDUSTRIAL APPLICABILITY

According to an aspect of the present invention, it is possible to fix an outer-side load transmitting block in a position in which a box-shaped protruding portion is housed in an engaging portion of the outer-side load transmitting block. By doing this, even if an impact load is input into the outer-side load transmitting block, for example, from a direction diagonally forward of or a direction diagonally rearward of the vehicle body (i.e., from a direction that intersects the transverse direction), any shifting of the outer-side load transmitting block or any deformation or the like of the protruding portion is suppressed. Accordingly, not only collision loads from directly side-on to the vehicle, but collision loads from diagonal directions and the like as well can be rapidly transmitted towards the inner side in the vehicle transverse direction irrespective of the input direction of the collision load.

DESCRIPTION OF THE REFERENCE SYMBOLS

1: Vehicle seat
13: Seat back frame
13c, 13d: Side frame portion
21: Load transmitting block (Outer-side transmitting block)
30: Side wall (Side surface)
51: Side airbag apparatus
70: Protruding portion
73: Housing portion (Engaging portion)
113: Seat back frame
113b: Bottom frame portion (Bottom reinforcing plate)
113c, 113d: Side frame portion
125: Load pass filter
128: Inclined channel (Inclined reinforcing portion)
132: Reinforcing plate
H101: Closed cross-sectional structure portion (Bottom reinforcing portion)

The invention claimed is:

1. A vehicle seat comprising:
a seat back frame that comprises a pair of side frame portions that are located on both left and right sides in the seat transverse direction;
an outer-side load transmitting block that is located further to an outer side in the transverse direction of the seat back frame than the side frame portion of the seat back frame, and that transmits an impact load that is input from a side of the vehicle body to the seat back frame;
a protruding portion that protrudes from a side surface of the side frame portion on the outer side in the transverse direction of the seat back frame towards the outer side in the transverse direction of the seat back frame;
a side airbag apparatus that is located on a front surface of the protruding portion; and
an engaging portion that is formed in the outer-side load transmitting block, and that receives the protruding portion, wherein
the protruding portion is formed in a box shape that has a supporting surface on a surface thereof that faces the side airbag apparatus.

2. The vehicle seat according to claim 1, wherein the vehicle seat further comprises a bottom reinforcing plate that connects together bottom portions of the pair of side frame portions.

3. The vehicle seat according to claim 2, wherein the vehicle seat further comprises a supporting plate that is located above the bottom reinforcing plate, and that comprises an inclined reinforcing portion that is diagonally inclined from the side frame portion that is located on the outer side from among the pair of side frame portions downwards and also inwards in the seat transverse direction.

4. The vehicle seat according to claim 3, wherein an end portion on the outer side in the transverse direction of the inclined reinforcing portion of the supporting plate is connected to the side frame portion on the outer side, and a bottom edge of the supporting plate is connected to the bottom reinforcing plate over substantially the entire length thereof in the seat transverse direction.

5. The vehicle seat according to claim 4, wherein the inclined reinforcing portion of the supporting plate comprises a reinforcing plate.

6. The vehicle seat according to claim 5, wherein the inclined reinforcing portion and the reinforcing plate form a closed cross-sectional shape.

7. The vehicle seat according to claim 4, wherein the vehicle seat further comprises a bottom reinforcing portion that extends in the seat transverse direction, and
- the supporting plate and the bottom reinforcing plate form a closed cross-sectional shape.

8. The vehicle seat according to claim 4, wherein
- the inclined reinforcing portion of the supporting plate comprises a reinforcing plate, and
- the supporting plate comprises: the inclined reinforcing portion, which is formed by the supporting plate and the reinforcing plate in a closed cross-sectional shape; and the bottom reinforcing portion, which is formed by the supporting plate and the bottom reinforcing plate in a closed cross-sectional shape, and which extends in the seat transverse direction.

\* \* \* \* \*